United States Patent
Shindou et al.

(10) Patent No.: US 6,217,425 B1
(45) Date of Patent: Apr. 17, 2001

(54) APPARATUS AND METHOD FOR LAPPING MAGNETIC HEADS

(75) Inventors: Hiroshi Shindou; Tetsuo Abe; Akio Ogawa; Tsugihiro Hasebe, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/327,710

(22) Filed: Jun. 8, 1999

(30) Foreign Application Priority Data

Jun. 12, 1998 (JP) .................................................. 10-165473

(51) Int. Cl.[7] ....................................................... B24B 7/22
(52) U.S. Cl. ................. 451/259; 451/5; 451/28; 451/494; 29/603.16; 29/603.17
(58) Field of Search ..................................... 451/259, 383, 451/391, 1, 5, 11, 364, 28, 56, 57, 443, 444, 494; 29/701, 702, 703, 603.9, 603.16, 603.17

(56) References Cited

U.S. PATENT DOCUMENTS

| | | | |
|---|---|---|---|
| 4,104,099 | * | 8/1978 | Scherrer ................................ 156/155 |
| 4,186,480 | * | 2/1980 | Binder Kriegelstein ............... 29/603 |
| 4,272,924 | * | 6/1981 | Masuko et al. ......................... 51/165 |
| 4,689,877 | | 9/1987 | Church . |
| 4,901,477 | * | 2/1990 | Loladze et al. ...................... 51/109 R |
| 4,914,868 | | 9/1988 | Church et al. . |
| 5,065,483 | | 11/1991 | Zammit . |
| 5,210,667 | | 5/1993 | Zammit . |
| 5,317,837 | * | 6/1994 | Stahli ................................. 51/165.77 |
| 5,620,356 | | 4/1997 | Lackey et al. . |
| 5,807,162 | * | 9/1998 | Dana ....................................... 451/28 |
| 5,921,853 | * | 7/1999 | Nishio .................................. 451/289 |
| 5,957,749 | * | 9/1999 | Finarov .................................... 451/6 |
| 5,961,378 | * | 10/1999 | Inaba .................................... 451/259 |
| 5,984,764 | * | 11/1999 | Saito et al. ............................. 451/56 |
| 5,993,290 | * | 11/1999 | Yoshihara et al. ...................... 451/28 |
| 5,993,298 | * | 11/1999 | Duescher ............................... 451/56 |

FOREIGN PATENT DOCUMENTS

| | | |
|---|---|---|
| 55-150120 | 11/1980 | (JP) . |
| 58-115618 | 7/1983 | (JP) . |
| 60-076011 | 4/1985 | (JP) . |
| 02-95572 | 4/1990 | (JP) . |

* cited by examiner

Primary Examiner—Lee Young
Assistant Examiner—Minh Trinh
(74) Attorney, Agent, or Firm—Frishauf, Holtz, Goodman, Langer & Chick, P.C.

(57) ABSTRACT

An apparatus for lapping a workpiece including a plurality of magnetic heads supported by a tool is disclosed. The lapping apparatus comprises a rotary lapping table, a lapping head attachment frame, an adjuster ring resiliently supported by the frame, a lapping head attached to the adjuster ring, a tilting assembly attached to the lapping head, and an up and down movable back plate pivotally attached to the lapping head. The apparatus further comprises first actuators or cylinders for correcting balance by applying forces on right and left sides of the pivotal point of the back plate, and second actuators or cylinders for correcting bow of the workpiece by applying operating forces on a plurality of predetermined locations of the tool so that the moving directions of movable parts of the second actuator means are substantially parallel with the directions of the operating forces.

11 Claims, 31 Drawing Sheets

APPARATUS AND METHOD FOR LAPPING MAGNETIC HEADS

BACKGROUND OF THE INVENTION

1. Field of the Invention

The present invention relates an apparatus and a method for lapping magnetic heads, and in particular to an apparatus and a method for lapping a workpiece provided with a plurality of magnetic heads.

2. Description of the Related Art

Conventionally, a thin film magnetic head, which is used in a disc drive in a computer, is manufactured in a batch process. In this process, a workpiece, provided with a ceramic bar (thereafter being divided into sliders) on which a row of transducers including a plurality of thin film magnetic heads are arranged, is lapped such that throat heights in gaps of the respective transducers are adjusted to have desired values at which optimum data signal processing can be realized.

A problem that exists in lapping such magnetic heads so as to obtain desired throat heights is that the ceramic bar or the workpiece is stressed and/or has an undesirable curvature or bow. Namely, when the ceramic bar is stressed and/or has an undesirable curvature or bow, a lapping apparatus can not uniformly lap the ceramic bar. For example, even if the throat heights of the magnetic heads on a center of the ceramic bar have optimum values, the throat heights of the magnetic heads on both ends of the ceramic bar might be too low or too high to have optimum values.

An apparatus for lapping magnetic heads, which can solve such problem, is disclosed in U.S. Pat. No. 5,620,356. The apparatus adjusts throat heights of thin film magnetic heads arranged on a ceramic bar to be optimum by correcting the curvature of the ceramic bar and lapping the corrected ceramic bar while measuring resistances whose values are changed by the throat heights.

In the lapping apparatus disclosed in the U.S. Patent, a workpiece, which is provided with a ceramic bar on which a row of transducers including a plurality of magnetic thin films are arranged, is adhered to a bottom of a tool which likes a long thin plate, and the tool is attached to a back plate of the apparatus. However, the conventional apparatus has a problem that an attitude of the back plate to which the tool is adhered is not based on the abrasive surface of a rotary lapping table. For example, let us assume a case that the back plate is set vertically based on the abrasive surface of the rotary lapping table which is set horizontally. In this case, if the abrasive surface of the lapping table is not set horizontally, the workpiece can not be lapped with accuracy, or flatness of the lapped workpiece is decreased. As a result, the throat heights of the magnetic heads become uneven.

Further, the conventional lapping apparatus is provided with three magnetic actuators which are used to correct the curvature or bow of the ceramic bar. However, since the magnetic actuators are operated to rotate arms and to supply operating forces to the workpiece through the pivotal movements of the arms, thrust characteristics of the magnetic actuators for rotating the arm are undesirably decreased.

SUMMARY OF THE INVENTION

It is therefore an object of the present invention to provide an apparatus and method for lapping magnetic heads which can decrease unevenness of throat heights of a plurality of magnetic heads arranged on a workpiece by increasing a flatness of the workpiece on a basis that the attitude of the workpiece is controllable based on an abrasive surface of a rotary lapping table.

It is another object of the present invention to provide an apparatus and method for lapping magnetic heads which can improve thrust characteristics of magnetic actuators for correcting a curvature or bow of a workpiece.

It is still another object of the present invention to provide an apparatus and method for lapping magnetic heads which can correct with accuracy the bow of the workpiece.

The above object is achieved according to the present invention by providing an apparatus for lapping a workpiece including a plurality of magnetic heads supported by a tool, the apparatus comprising a rotary lapping table having an abrasive surface, lapping head attachment means provided so as to be movable with respect to the lapping table, an adjuster ring resiliently supported by the lapping head attachment means so as to contact with the abrasive surface, a lapping head attached to the adjuster ring, the attitude of the lapping head being controlled by the adjuster ring, a tilting assembly attached to the lapping head so as to tilt around a tilt shaft parallel with the abrasive surface, tilting assembly drive means for tilting the tilting assembly with respect to the abrasive surface, a lift assembly movable up and down with respect to the tilting assembly, a back plate pivotally attached to the lower portion of the lift assembly, said tool being attached to the back plate, first actuator means for correcting balance by applying forces on right and left sides of the pivotal point of the back plate, and second actuator means for correcting bow of the workpiece by applying operating forces on a plurality of predetermined locations of the tool so that the moving directions of movable parts of the second actuator means are substantially parallel with the directions of the operating forces.

In a preferred embodiment of the present invention, the first actuator means is provided so that the moving directions of movable parts of the first actuator means are substantially parallel with the directions of the forces.

In another embodiment of the present invention, the second actuator means includes a plurality of second magnetic actuators.

In still another embodiment of the present invention, the second actuator means includes a plurality of low-friction type cylinders.

The above object is also achieved according to the present invention by providing a method for lapping a workpiece including a plurality of magnetic heads, the method comprising the steps of providing a tool for supporting the workpiece, a rotary lapping table having an abrasive surface, an adjuster ring contacting with the abrasive surface, a lapping head attached to the adjuster ring, a tilting assembly attached to the lapping head, a lift assembly movable up and down with respect to the tilting assembly, a back plate pivotally attached to the lower portion of the lift assembly, first actuator means for correcting balance by applying forces on the back plate, and second actuator means for correcting bow of the workpiece by applying operating forces on the tool so that the moving directions of movable parts of the second actuator means are substantially parallel with the directions of the operating forces, attaching the tool to the back plate, controlling the attitude of the lapping head by the adjuster ring, lapping the plurality of magnetic heads of the workpiece under the condition that the first actuator means applies forces on right and left sides of the pivotal point of the back plate and the second actuator means applies operating forces on a plurality of predetermined locations of the tool while the tool is supported by the lift assembly, and lapping the bottom surface of the workpiece under the condition that the tool is tilted with respect to the vertical plane to the abrasive surface of the lapping table by the tilting assembly being tilted with respect to the lapping head.

In a preferred embodiment of the present invention, the method further comprises the step of continuously rotating or oscillating in a predetermined angle the lapping head.

In another embodiment of the present invention, the method further comprises the step of rotating the adjuster ring.

In still another embodiment of the present invention, the method further comprises the step of reciprocating the lapping head and the adjuster ring.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, preferred embodiments of the present invention will be explained with reference to the drawings.

Figure 1:
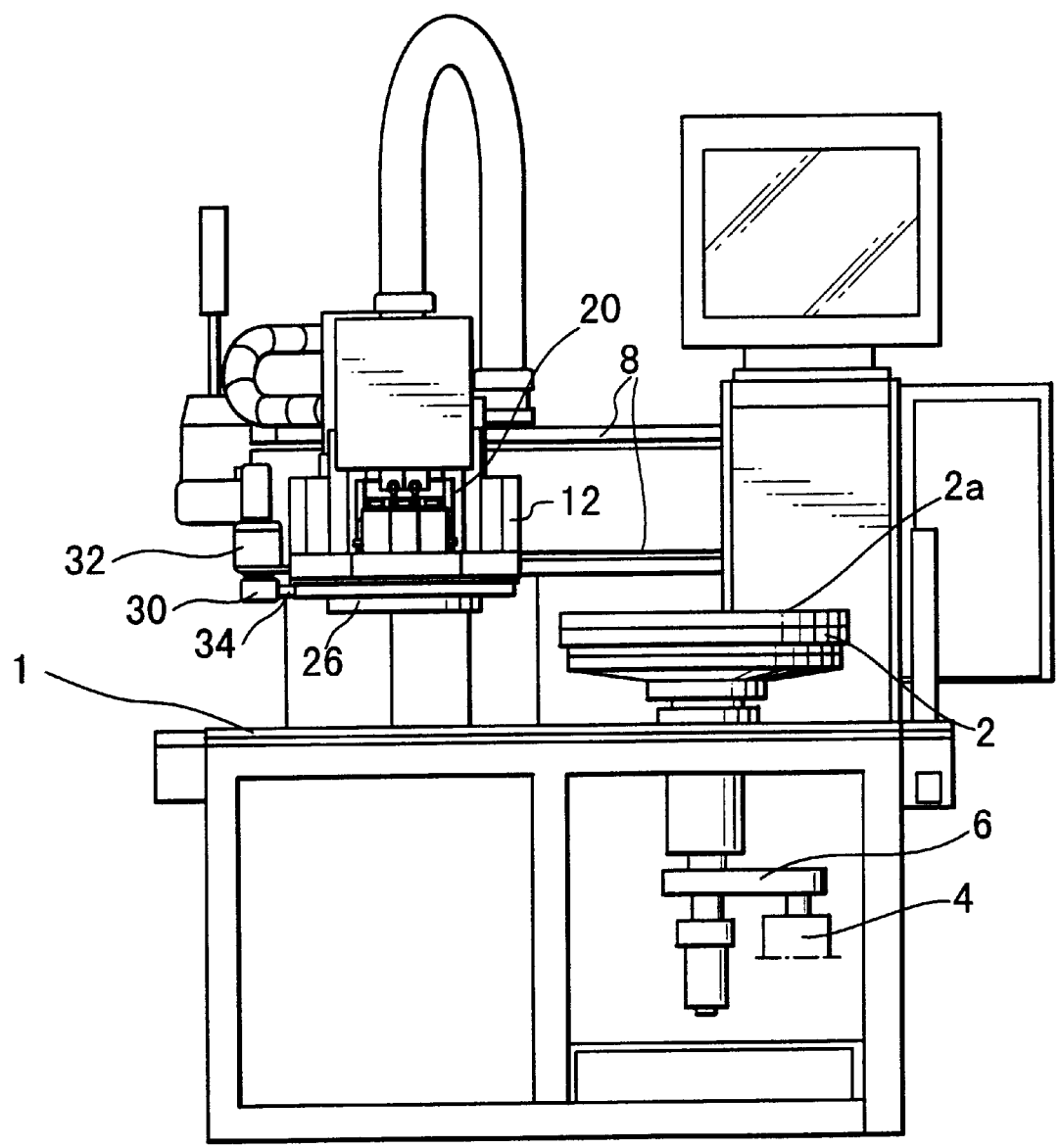
FIG. 1 is an overall front view of an apparatus for lapping magnetic heads according to a first embodiment of the present invention.
Figure 2:
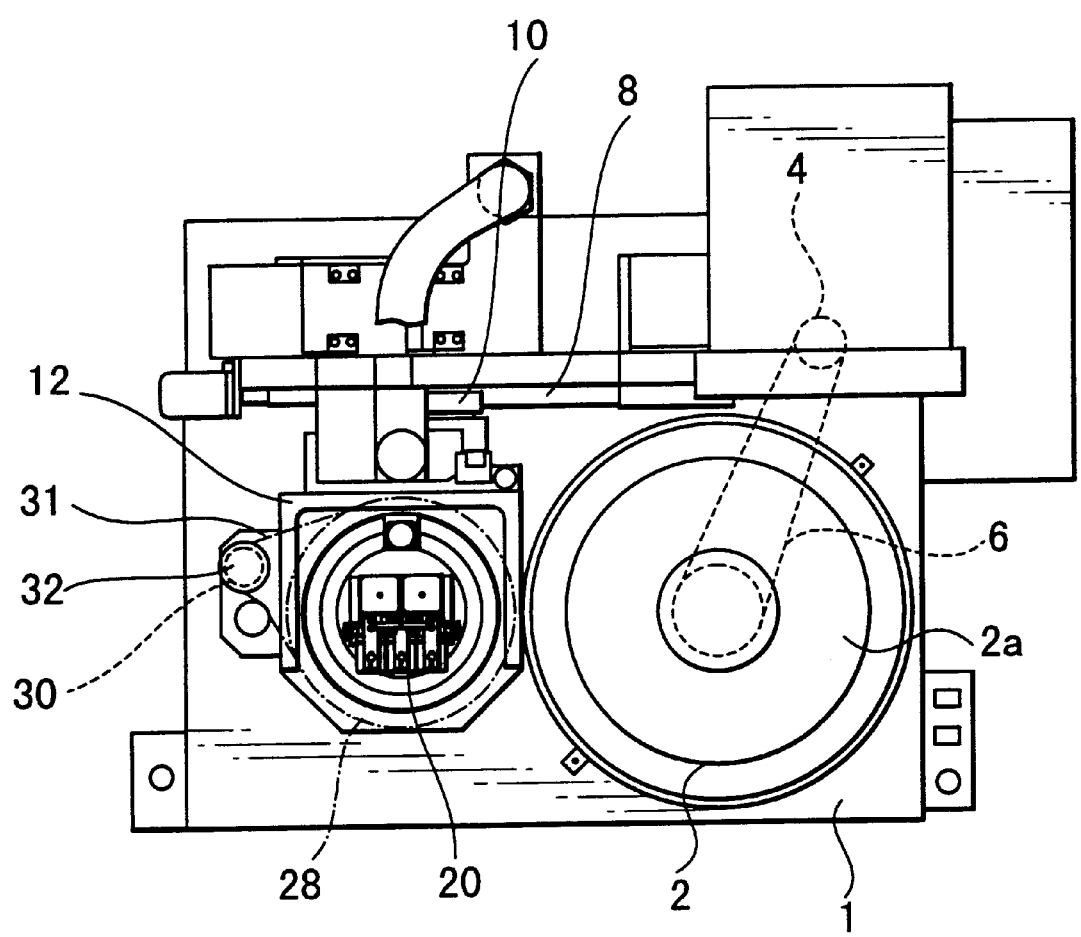
FIG. 2 is a plan view of FIG. 1.

First, a first embodiment of the present invention will be explained with reference to FIGS. 1–17. FIG. 1 is an overall front view of an apparatus for lapping magnetic heads according to a first embodiment of the present invention, and FIG. 2 is a plan view of FIG. 1.

An overall structure of an apparatus for lapping magnetic heads will be explained with reference to FIGS. 1 and 2. The lapping apparatus is provided with a base table 1. To the base table 1, a rotary lapping table 2 is rotatably supported within a horizontal plane and is driven by a motor 4 through a belt 6.

A pair of guide rails 8 are supported above the base table 1 so as to be vertically spaced from each other and to be extended along the horizontal direction, and a slider 10 is provided so as to horizontally move along the guide rails 8. A frame 12 for attaching a lapping head is attached to the slider 10 so as to vertically move. That is, the height of the frame 12 can be controlled. The slider 10 is provided with a ball thread nut, which is engaged with a ball thread shaft, extending in parallel with the guide rails 8. When a motor rotates the ball thread shaft, the slider 10 moves along the guide rails 8. Further, the slider 10 and the lapping head attaching frame 12 can reciprocate along the rails 8.

Figure 3:
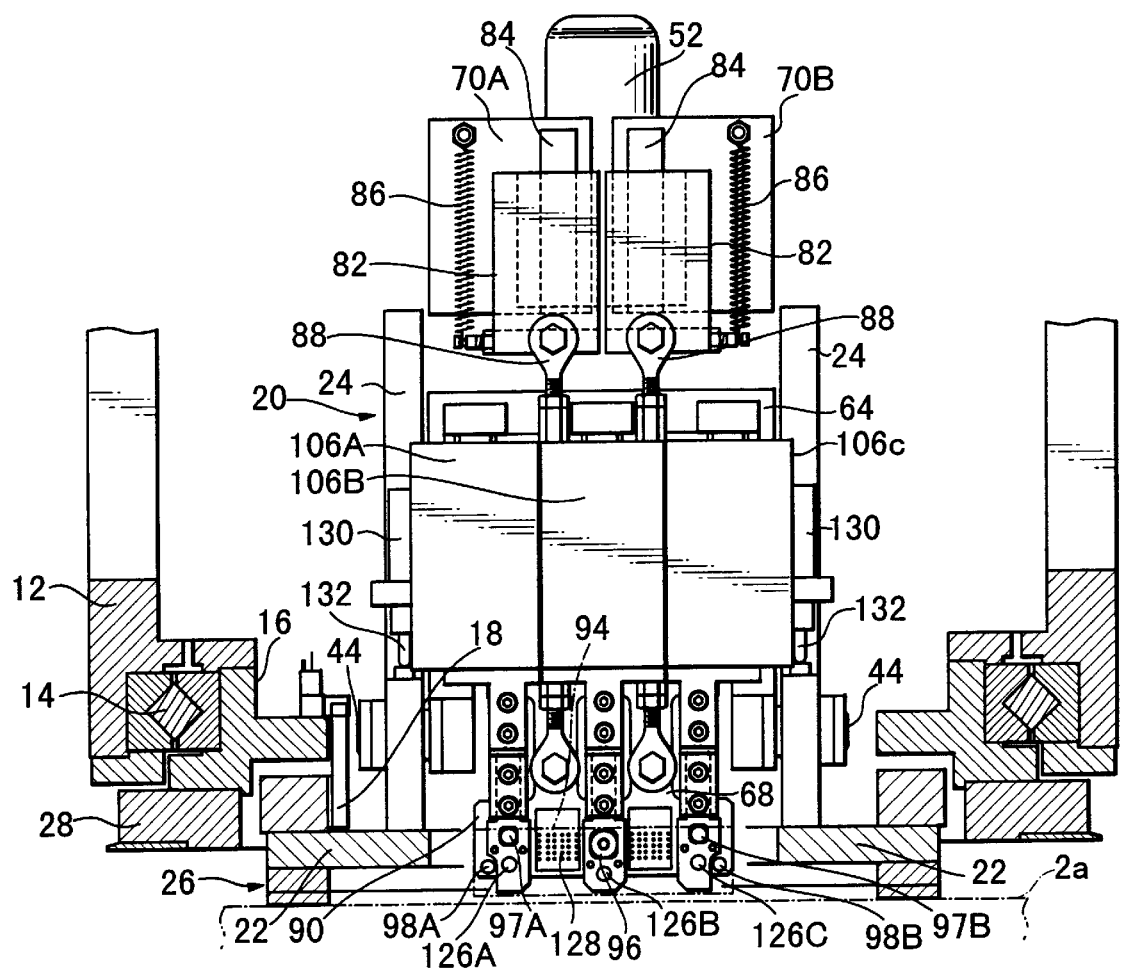
FIG. 3 is a front view of a lapping head and the like of the lapping apparatus according to the first embodiment of the present invention.
Figure 4:
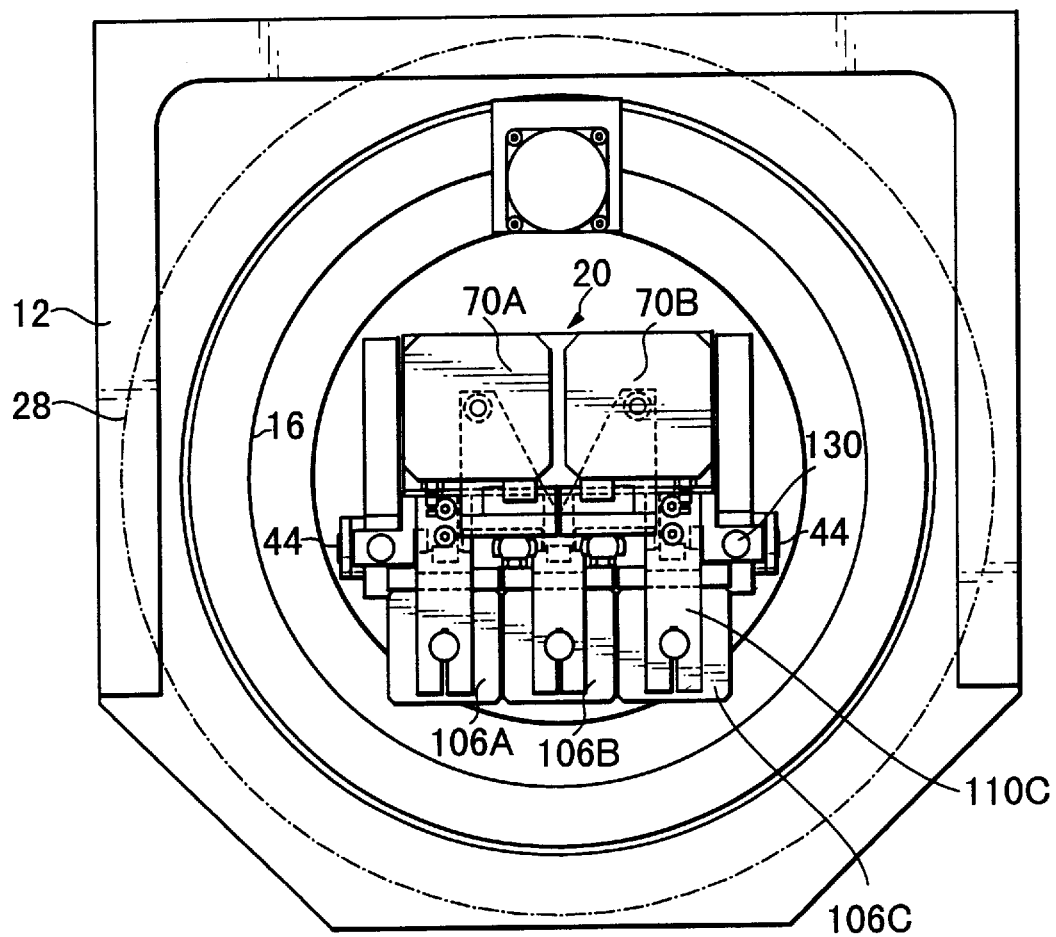
FIG. 4 is a plan view of FIG. 3.

Referring to FIG. 3, a rotation support 16 is rotatably supported by the inner side of the lapping head attachment frame 12 through a circular bearing 14. A lapping head 20 is attached to the rotation support 16 through a resilient member 18 such as a resilient plate or rubber. The lapping head 20 is provided with a bottom plate 22 and upright supporting plates 24, and an adjuster ring or wafer pad 26 is attached on the bottom surface of the bottom plate 22. The adjuster ring 26 is used so as to contact with an abrasive surface 2*a* of the rotary lapping table 2.

Referring to FIGS. 2 and 3, a belt wheel or pulley 28 is secured to the rotation support 16, and a motor 32 is installed outside of the frame 12 to rotate a belt wheel or pulley 30. A belt 34 is wound between the belt wheels 28 and 30. The motor 32, the belt wheels 28 and 30 and the belt 34 work as a rotating means for oscillating or rotating both the lapping head 20 and the adjuster ring 26 in a predetermined angular range.

Figure 10:
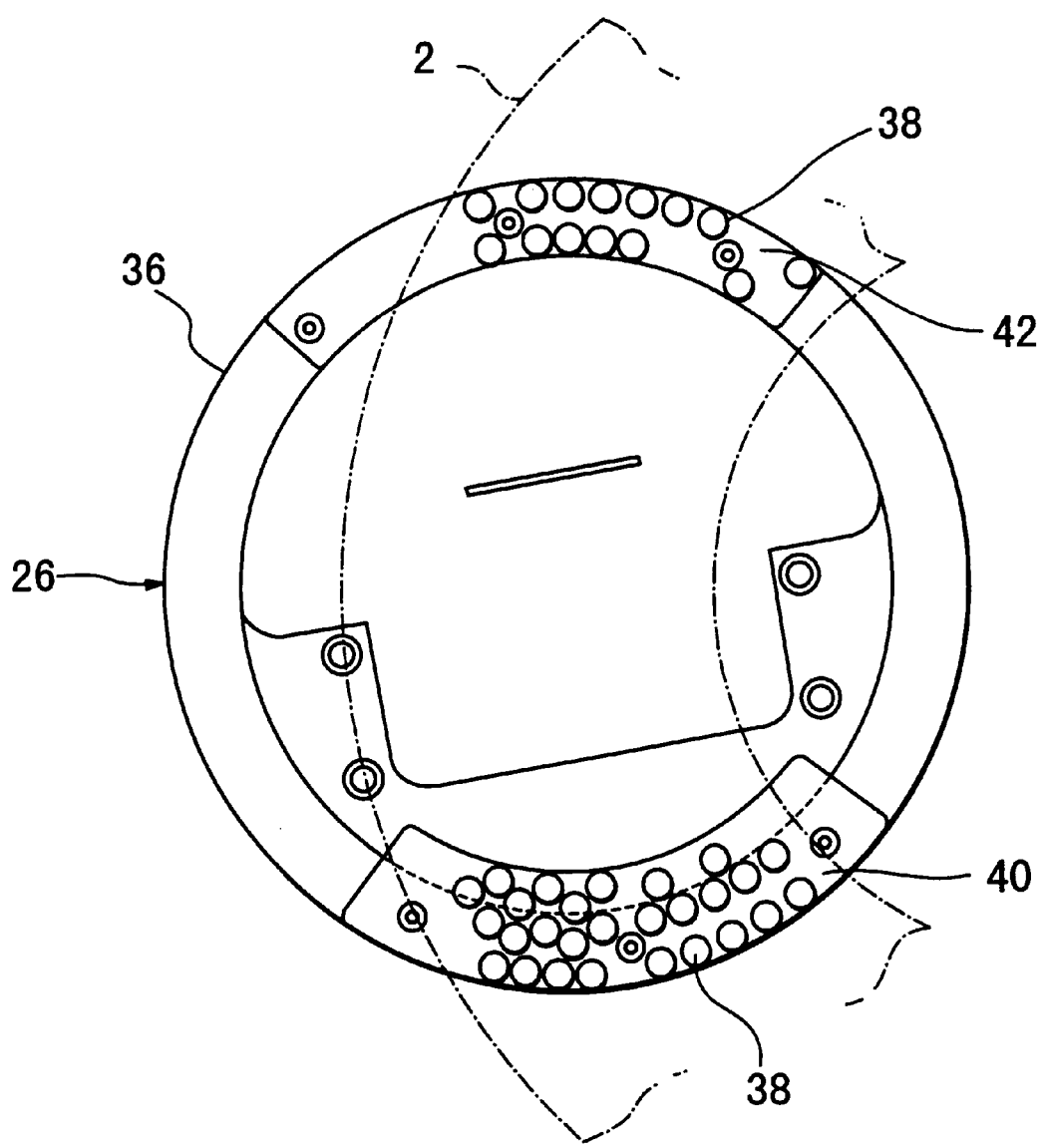
FIG. 10 is a bottom view of an adjuster ring according to the first embodiment of the present invention.

FIG. 10 shows a bottom view of the adjuster ring 26. Referring to FIG. 10, the adjuster ring 26 includes an aluminum ring body 36 and a plurality of cylindrical abrasion resisting ceramic dummies 38 buried in the body 26, the lower ends of the dummies 38 slightly downwardly project from the body 26. The number of dummies 38 is determined based on a weight balance of the lapping head 20 disposed on the adjuster ring 26. In the case of the adjuster ring 26 shown in FIG. 10, more dummies 38 are buried in a circumference portion 40 than in a circumference portion 42, since the portion 40 supports more weight of the lapping head 20 than the portion 42.

Figure 5:
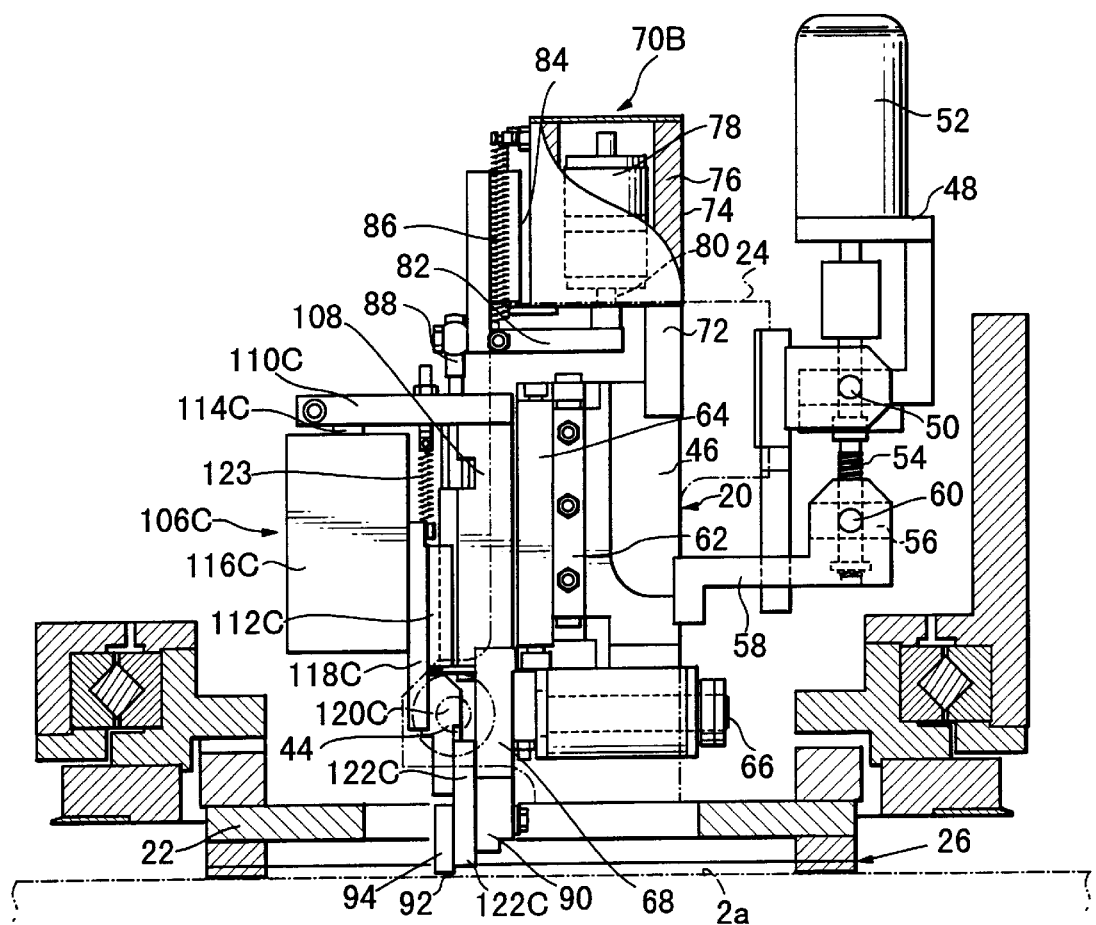
FIG. 5 is a side sectional view of FIG. 3.
Figure 6:
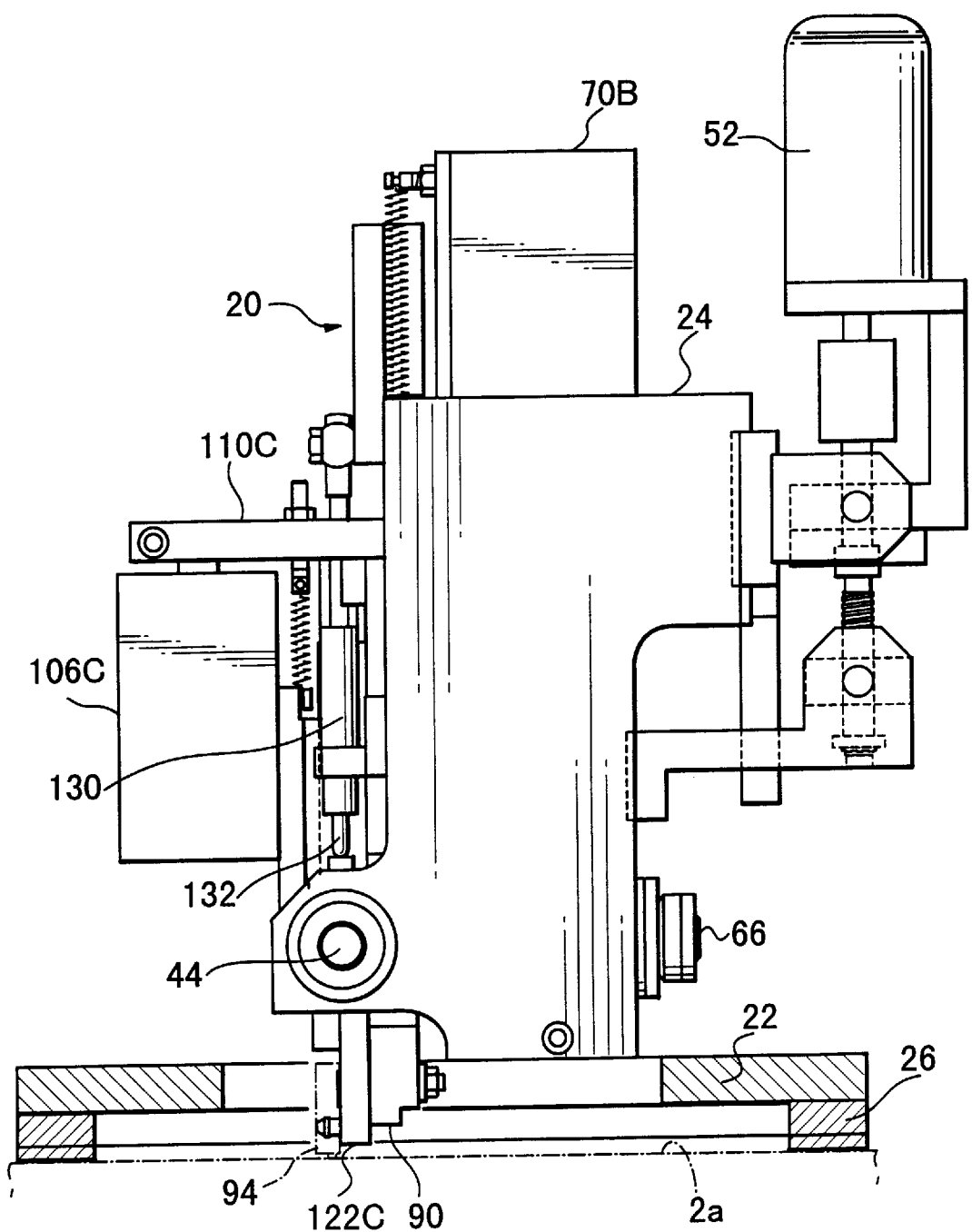
FIG. 6 is a side view of FIG. 3.

Referring to FIGS. 3–6, a tilt shaft 44 is fixed between the upright supporting plates 24 of the lapping head 20 so as to be parallel with the bottom surface of the adjuster ring 26, that is, the abrasive surface 2*a* of the lapping table 2. A tilting assembly 46 is secured to the tilt shaft 44 so as to tilt around the tilt shaft 44 with respect to the lapping head 20. Referring to FIGS. 5 and 6, the lower end of a motor attachment seat 48 is rotatably connected at a fulcrum shaft 50 with the upright supporting plates 24 of the lapping head 20, and a motor 52 for tilting the tilting assembly 46 is fixed on the upper end of the motor attachment seat 48. The driving shaft of the motor 52 is connected with a ball thread shaft 54 with which a ball thread nut 56 is engaged. The one end of an arm 58 is connected at a fulcrum shaft 60 with the ball thread nut 56, and other end of the arm 58 is connected with the tilt assembly 46. These components 50–60 work as a tilting means for tilting the tilting assembly 46 by a predetermined angle from the position of the tilting assembly 46 being vertical to the abrasive surface 2*a* of the lapping table 2.

A lift assembly 64 is attached with the tilt assembly 46 through a slide bearing or cross roller guide 62 so as to move up and down. The lift assembly 64 is tilted together with the tilt assembly 46, and therefore both the lift assembly 64 and the tilt assembly 46 can be always kept in parallel condition. A back plate 68 is attached to the lower end of the lift assembly 64 so as to pivot on a fulcrum shaft 66 which is parallel with the abrasive surface 2*a* of the lapping table 2 and is perpendicular to the tilt shaft 44.

Referring to FIGS. 3 and 5, a pair of magnetic actuators 70A and 70B for balance correction are attached to the upper portion of the tilt assembly 46 through brackets 72. These magnetic actuators 70A and 70B are provided to push downwardly the right and left sides of the back plate 68 with respect to the fulcrum shaft 66 and to control the load applied on the back plate 68. The magnetic actuators 70A and 70B for balance correction are respectively provided with frames 74, coils 76 attached to the insides of the frames 74, magnets 78 installed at the centers of the frames 74 and rods 80 integrally connected with the centers of the magnets 78. The frames 74 and the coils 76 are stationary, and the magnets 78 and the rods 80 are movable. The structures of the actuators 70A and 70B are explained hereinafter in detail with reference to FIGS. 12 and 13.

The lower ends of the rods 80 of the actuators 70A and 70B are respectively connected with lift members 82 whose cross sections have L-letter shapes and which are movable up and down along slide bearings 84 fixed to the frames 74 of the actuators 70A and 70B. Spring members 86 respectively connect the upper portions of the frames 74 with the lift members 82 so that the biasing forces of the spring members 86 can cancel the weights of the movable magnets 78. The lower portions of the lift members 82 are respectively connected with the right side and the left side of the back plate 68 through connecting links 88. Pivotal points on the back plate 68 of the right and left connecting links 88 are indicated as R and L in FIG. 3. Thus, the moving directions of the magnets 78 of the magnetic actuators 70A and 70B for balance correction are substantially parallel to the directions of the pushing pressures or forces applied to the back plate 68. If the total weight of the lifting portion including the lift assembly 64, the back plate 68 and the like are relatively large, the magnetic actuators 70A and 70B for balance correction are operated so as to pull up the lifting portion.

Figure 7:
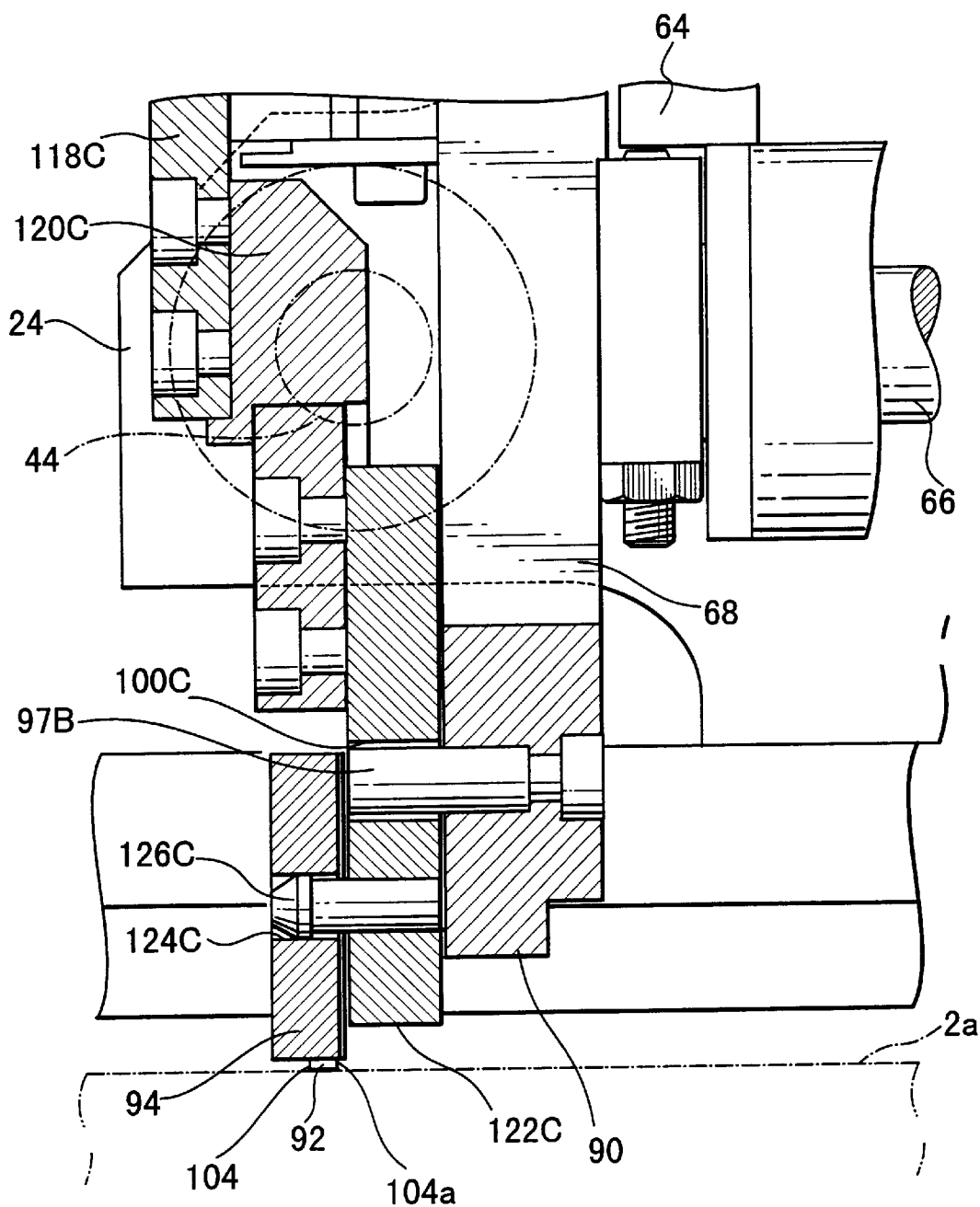
FIG. 7 is a partial enlarged sectional side view cut at the position of a bow correction pin located at the right side of a tool.
Figure 8:
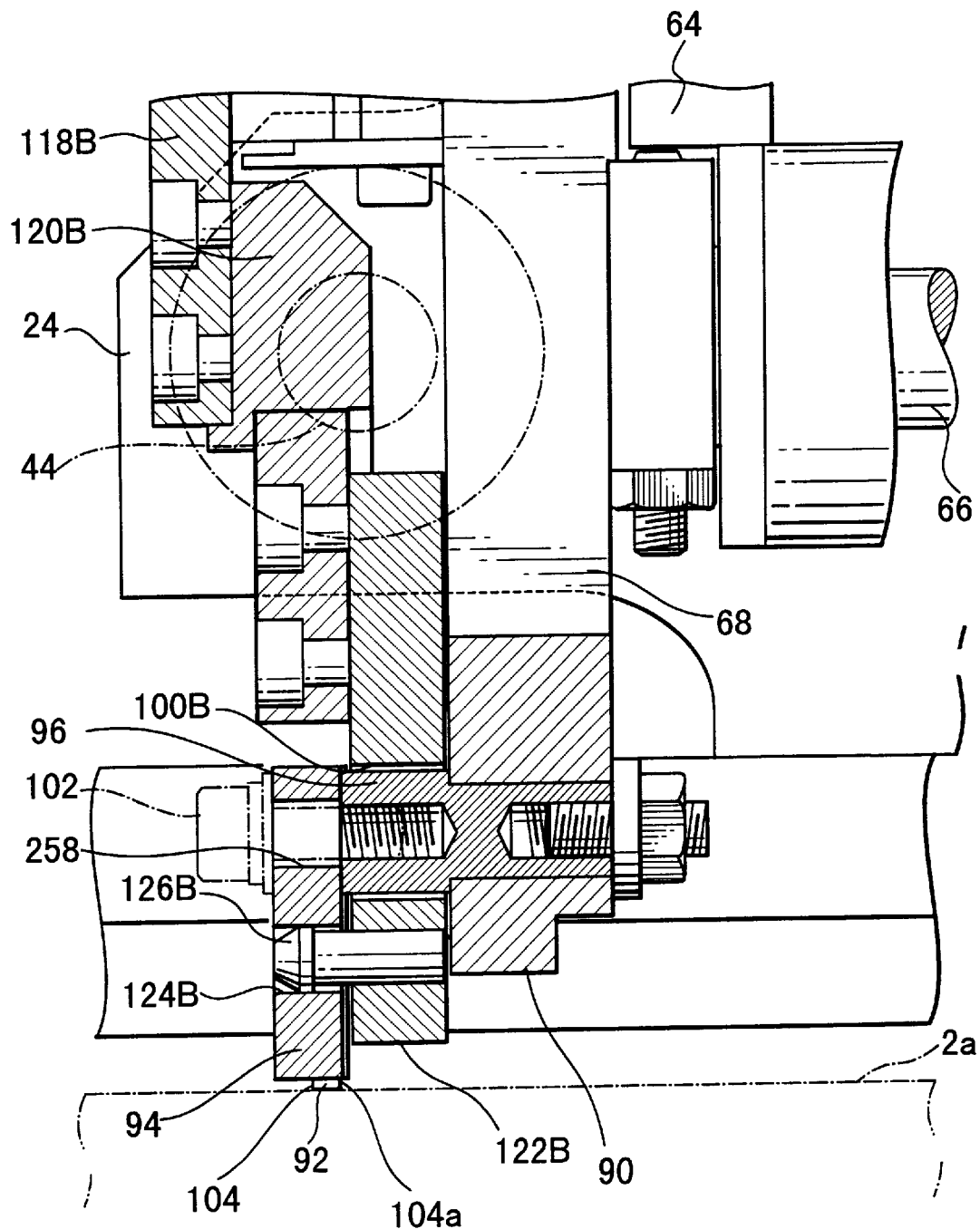
FIG. 8 is a partial enlarged sectional side view cut at the position of a bow correction pin located at the center of the tool.
Figure 9:
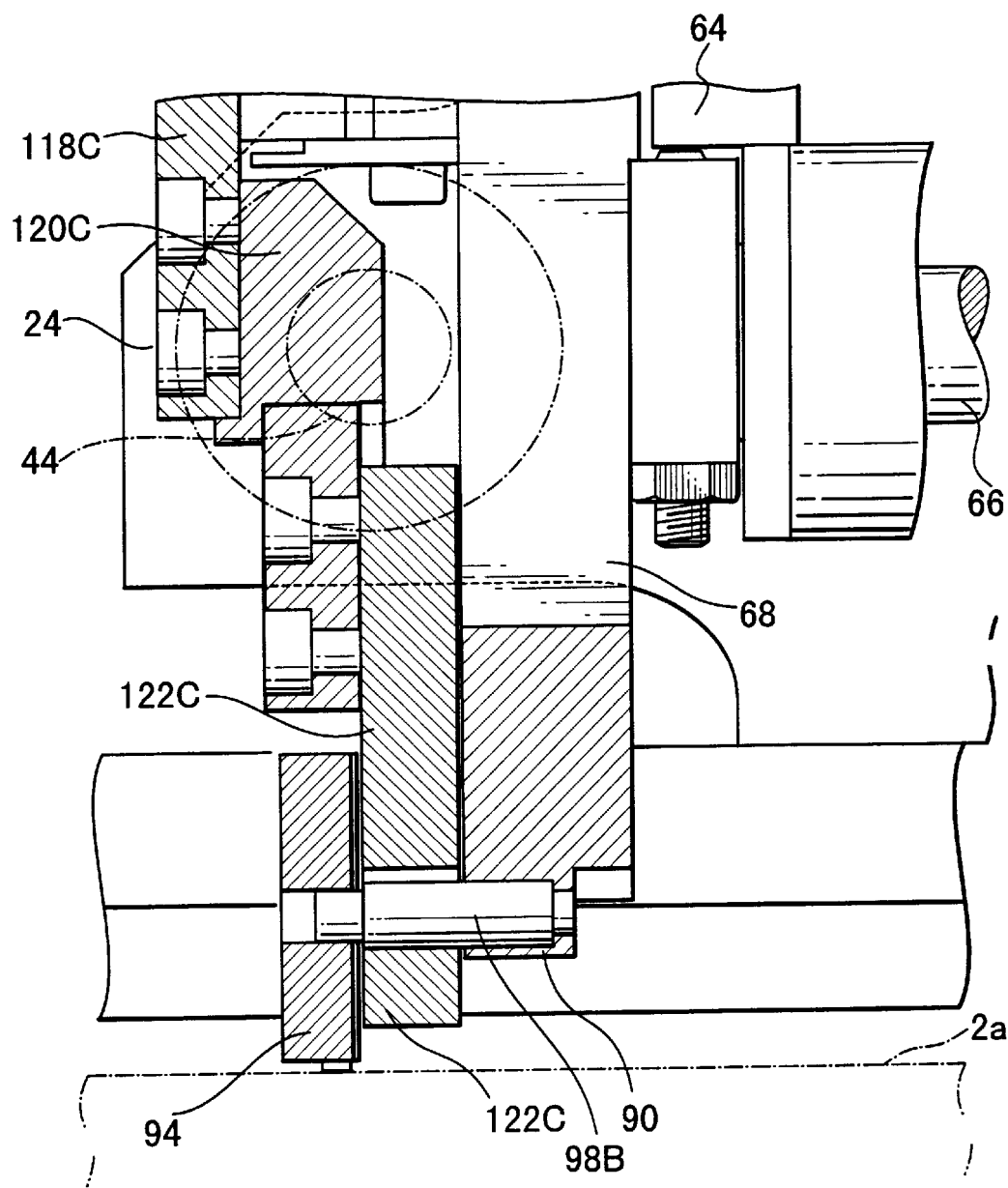
FIG. 9 is a partial enlarged sectional side view cut at the position of a positioning pin located at the right side of a back plate.

Referring to FIGS. 3 and 7–9, the back plate 68 includes a lower end portion 90 shaped like a rectangular plate. On the front side of the lower end portion 90 of the back plate 68, there is integrally provided with a fixing pin 96 (see FIG. 8) on the center, two stopper pins 97A and 97B (see FIG. 7) at right and left sides and positioning pins 98A and 98B (see FIG. 9) at both ends portions. As shown in FIG. 8, a screw 102 threadably engages with the front portion of the fixing pin 96 such that the tool 94 which is a rectangular plate is supported at only one point by the lower end portion 90 of the back plate 68. The stopper pins 97A and 97B secured to the right and left sides of the lower end portion 90 of the back plate 68 work as positioning pins, when lift members 122A, 122B and 122C are attached to the lower end portion 90 of the back plate 68. The stopper pins 97A and 97B and the fixing pin 96 have diameters which are respectively smaller by predetermined lengths than those of through holes 100A, 100B and 100C provided in the lift members 122A, 122B and 122C for bow correction. As a result, the stopper pins 97A and 97B also work so as to stop the undesirable movements of the lift members 122A, 122B and 122C for bow correction when the lift members 122A, 122B and 122C undesirably move up and down. Referring to FIGS. 3 and 9, the positioning pins 98A and 98B are secured to both end portions of the lower end portion 90 of the back plate 68 to avoid the contact with a tool 94 when the curvature or bow correction of the tool 94 is carried out. The positioning pins 98A and 98B further work so as to position the tool 94 when the tool 94 is attached to the lower end portion 90 of the back plate 68 through the lift members 122A, 122B and 122C.

Figure 11:
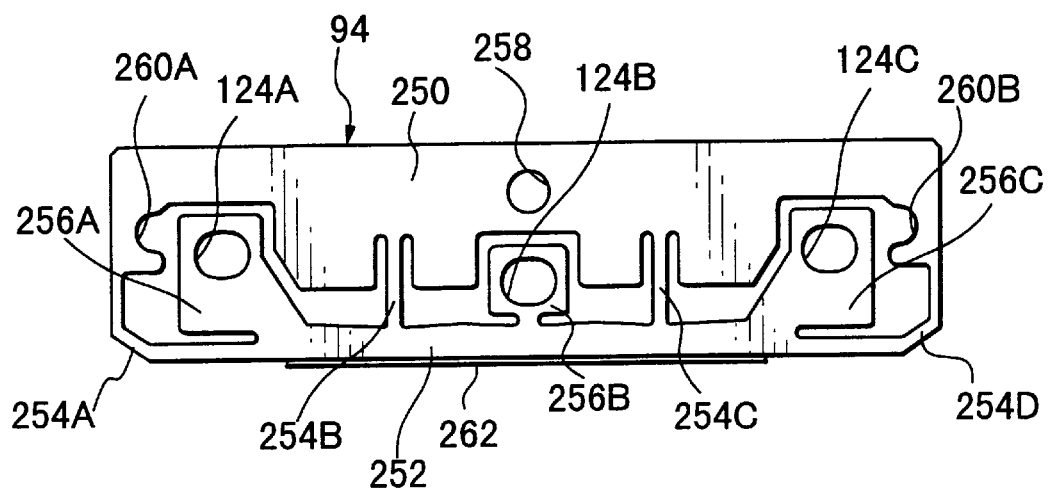
FIG. 11 is an enlarged front view of a tool which is used in the lapping apparatus according to the first embodiment of the present invention.

The tool 94 will be explained in detail with reference to FIG. 11. Referring to FIG. 11, the tool 94 is comprised of a body portion 250, a supporting portion 252 for supporting a workpiece 92, four connecting portions 254A–254D, correction holes 124A–124C through which correction pins 126A–126C are inserted and which are connected with the supporting portion 252 and arm portions 256A–256C connecting the correction holes 124A–124C with the supporting portion 252. The correction hole 124B is formed on the center of the longitudinal direction of the tool 94, and the other two correction holes 124A and 124C are formed on the tool 94 symmetrically with respect to the correction hole 124B in the right and left directions.

The tool 94 is further comprised of a fixing hole 258, located on the center of the longitudinal direction and on an upper side of the vertical direction thereof, through which the screw 102 is inserted to connect the body portion 250 with the fixing pin 96. The body portion 250 is provided with engaging portions 260A and 260B with which the positioning pins 98A and 98B are engaged so as to position the tool 94.

The supporting portion 252 of the tool 94 has an elongated beam structure which can be bent by operating forces of the lift members 122A–122C. A workpiece fixing portion 262 is formed on the lowest end surface of the supporting portion 252, and the workpiece 92 is adhered on the bottom surface of the workpiece fixing portion 262.

The workpiece 92 is provided with an elongated ceramic bar 104 (thereafter being divided into sliders of the magnetic heads) on which a row of transducers including a plurality of magnetic heads respectively having magnetic thin film patterns. The thin film patterns of the transducers are located on one longitudinal side surface 104a of the ceramic bar 104. Thus, by lapping the bottom surface of the ceramic bar 104, the throat heights of the transducers located on the side surface 104a can be changed or reduced.

Referring to FIGS. 3 and 5, magnetic actuators 106A, 106B and 106C are provided on the front side of the back plate 68 so as to correct the curvature or bow of the workpiece 92 attached on the bottom surface of the tool 94.

Referring to FIG. 5, the magnetic actuators 106C for bow correction works so as to apply an operating force to the right side portion of the tool 94. The back plate 68 is integrally provided with an upper extended portion 108 located on the upper side thereof. One end of a rod holder 110C is fixed on the upper end of the upper extended portion 108 of the back plate 68, and other end of the rod holder 110C is fixed to a rod 114C of the magnetic actuator 106C. A slide bearing 112C is attached on the front side of the upper extended portion 108 of the back plate 68 (the left side in FIG. 6). The magnetic actuators 106A, 106B and 106C for bow correction generally have the same structures as those of the magnetic actuators 70A and 70B for balance correction except that the rod 114C and the magnet attached to the rod 114C are stationary and the coil provided circumferentially outside of the magnet is downwardly and upwardly movable. Namely, the magnetic actuator 106C is provided with a frame 116 having the coil to which lift members 118C, 120C and 122C for bow correction are integrally attached, and the lift member 118C is provided so as to move or slide along the slide bearing 112C. A spring member 123 connects the rod holder 110C with the lift member 118C so as to cancel the weight of the movable coil and frame 116C of the actuator 106C by a biasing force thereof.

Referring to FIGS. 7 and 8, the lift member 122C for bow correction can move up and down in a space between the lower end portion 90 of the back plate 68 and the tool 94 attached to the lower end portion 90. The bow correction pin 126C is secured to the lift member 122C and is fitted into a correction hole 124C located at the right side of the tool 94. When the coil and the frame116C of the magnetic actuator 106C move up and down, an operating force is applied to the correction pin 126C through the lift members 118C, 120C and 122C. The correction pin 126C minutely moves up and down, and as a result not only the height of the right side of the tool 94 but also the height of the right side of the workpiece 92 are minutely changed. The moving directions of the coil and the frame 116C of the magnetic actuator 106C for bow correction are substantially parallel with the direction of the operating force applied to the workpiece 92.

The magnetic actuator 106A for bow correction works so as to apply an operating force to the left side portion of the tool 94 and has the same structure as that of the actuator 106C. When the coil and the frame 116A of the magnetic actuator 106A move up and down, an operating force is applied to the bow correction pin 126A through the lift members 118A, 120A and 122A. The correction pin A minutely moves up and down, and as a result not only the height of the left side of the tool 94 but also the height of the left side of the workpiece 92 are minutely changed. The moving directions of the coil and the frame 116A of the magnetic actuator 106A for bow correction are substantially parallel with the direction of the operating force applied to the workpiece 92.

The magnetic actuator 106B for bow correction works so as to apply an operating force to the center portion of the tool 94 and has the same structure as that of the actuator 106C. When the coil and the frame 116B of the magnetic actuator 106B move up and down, an operating force is applied to the bow correction pin 126B through the lift members 118B, 120B and 122B. The correction pin 126B minutely moves up and down, and as a result not only the height of the center of the tool 94 but also the height of the center of the workpiece 92 are minutely changed. The moving directions of the coil and the frame 116B of the magnetic actuator 106B for bow correction are substantially parallel with the direction of the operating force applied to the workpiece 92.

Thus, the operating forces of the magnetic actuators 106A, 106B and 106C for bow correction are applied to the right, left and center of the tool 94, and as a result distortion and bow of the workpiece 92 attached on the bottom surface of the tool 94 are corrected as shown in FIGS. 7–9.

The lapping process is carried out in order to obtain optimum values of the throat heights of the respective transducers of the magnetic heads arranged on the longitudinal side surface 104a of the ceramic bar 104 or the workpiece 92, while the electric resistances, which correspond to the throat heights, of the transducers located on the right, left and center of the ceramic bar 104 are measured in a predetermined cycle. Namely, electrodes connected to the transducers are provided on the back surface of the tool 94 facing the lower end portion 90 of the back plate 68, and the electrodes on the tool 94 are connected with measuring pins 128 planted in the lower end portion 90 (see FIG. 3). The measuring pins 128 are connected with a device (not shown) for measuring electric resistances.

Referring to FIGS. 3 and 6, contact-type sensors 130 are attached with the both right and left ends of the upper extended portion 108 for detecting vertical positions of the right and left ends of the tool 94 attached to the lower end portion 90 of the back plate 68. The heights of right and left ends of the upper extended portion 108 substantially correspond to those of the right and left ends of the tool 94. The lower end of the contact of the sensor 130 contacts with a convex surface provided on the upright supporting plate 24 of the lapping head 20. The contact-type sensor 130 generates electrostatic capacity which is proportional to the projection amount of the contact. However, other types of the sensors may be employed in the present invention. Thus, the two sensors 130 not only detect the heights of both right and left ends of the upper extended portion 108 but also detect the heights of the right and left end portions of the tool 94, and as a result the lapped amount and the balance of the right and left are detected.

As explained above, the magnetic actuators 70A and 70B for balance correction have the stationary coils 76 and the movable magnets 78. On the contrary, the magnetic actuators 106A, 106B and 106C for bow correction have the stationary magnets and the movable coils. According to the embodiment of the present invention, the magnetic actuators 70A and 70B for balance correction have the movable coils and the stationary magnets, and the magnetic actuators 106A, 106B and 106C for bow correction have the movable magnets and the stationary coils.

Figure 13:
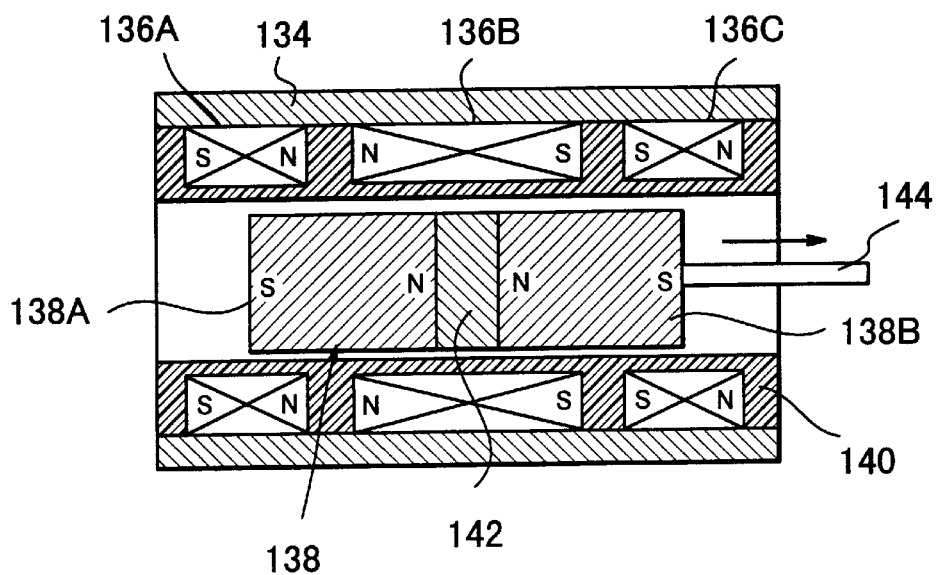
FIG. 13 is a sectional view of a magnetic actuator used in the first embodiment of the present invention.

Next, the structures of the magnetic actuators 70A and 70B for balance correction and the magnetic actuators 106A, 106B and 106C for bow correction will be explained with reference to FIG. 13. Referring to FIG. 13, a magnetic actuator includes a cylindrical yoke or frame 134 made out of soft magnetic material. Three coils 136A, 136B and 136C and cylindrical guide body 140 for slidably guiding magnet 138 are installed inside of the yoke 134. The guide body 140 is an insulation member such as dielectric resin and is attached to the inside of the yoke 134. The magnet 138 is provided with two cylindrical rare earth permanent magnets 138A and 138B where same poles thereof are opposed and a cylindrical soft magnetic body 142 secured between the magnets 138A and 138B. The permanent magnets 138A and 138B and the soft magnetic body 142 are formed as one piece by using an adhesive. The three coils 136A, 136B and 136C are electrically connected so that the current flows in opposite directions at the positions between the poles of the respective magnets 138A and 138B. The center coil 136B encloses the soft magnetic body 142 and the ends including N poles of the permanent magnets 138A and 138B, the both end coils 136A and 136C respectively enclose the ends including S poles of the permanent magnets 138A and 138B. Further, the current direction flown in the center coil 136B is opposite to those of the both end coils 136A and 136C (see N and S in FIG. 13). Further, a rod 144 for transmitting a thrust to outside is attached to one of the permanent magnets 138A and 138B.

Figure 12:
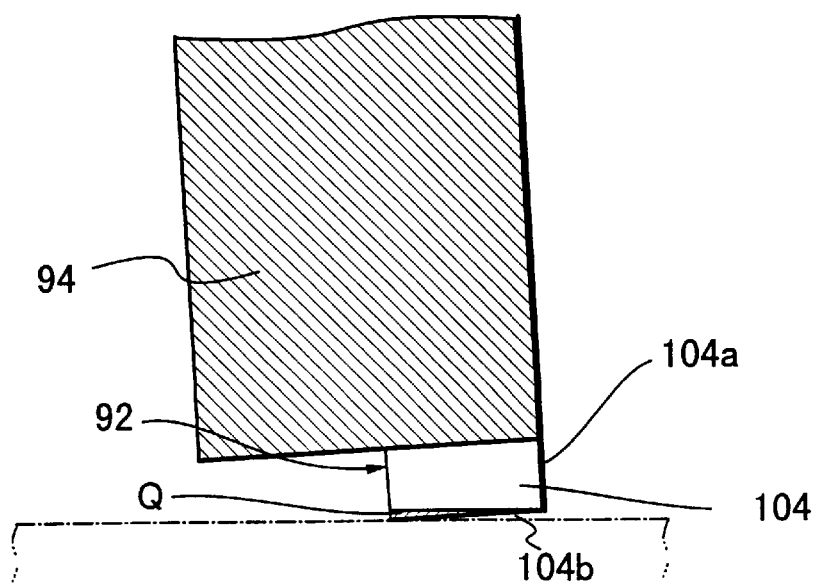
FIG. 12 is a partial enlarged sectional side view of a workpiece for explaining a second lapping process according to the first embodiment of the present invention.

When the cylindrical yoke 134 is stationary, the magnet 138 is movable in a direction shown by an arrow in FIG. 12. Namely, the yoke or frame 134, the coils 136A, 136B and 136C and the guide body 140 are stationary, the rod 144 and the magnet 139 are movable. On the contrary, when the rod 144 and the magnet 138 are stationary, the yoke or frame 134, the coils 136A, 136B and 136C and the guide body 140 are movable.

In the magnetic actuator explained above, the vertical component of surface magnetic flux density of the magnet 138 increases much more since the soft magnetic cylindrical yoke 134 is provided outside of the respective coils 136A, 136B and 136C. Accordingly, the magnetic flux, which is generated based on Fleming's right-hand rule to be vertical to a longitudinal direction of the magnet 138 and contributes to the thrust, is increased. Further, when electric current is applied to the three coils 136A, 136B and 136C so that the magnetic field alternatively having reverse magnetic properties are generated, much larger thrust can be generated.

Figure 14:
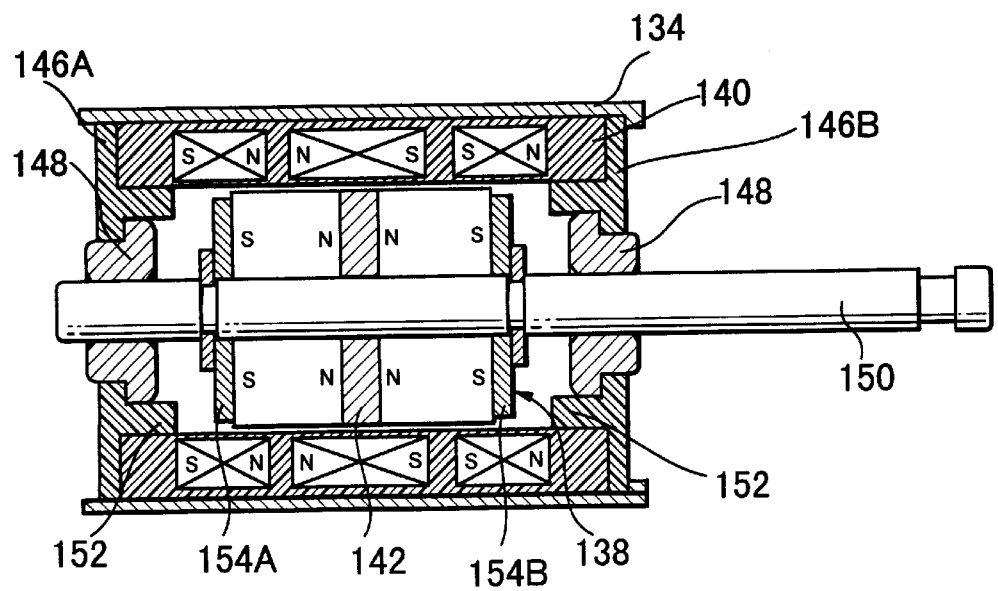
FIG. 14 is a sectional view of another example of a magnetic actuator used in the first embodiment of the present invention.

Another example of magnetic actuator as shown in FIG. 14 may be employed as the magnetic actuators 70A and 70B for balance correction and the magnetic actuators 106A, 106B and 106C for bow correction. Referring to FIG. 14, a basic structure of a magnetic actuator in FIG. 14 is the same as that of the magnetic actuator in FIG. 13 except following items. The magnetic actuator in FIG. 14 is provided with non-magnetic side plates 146A and 146B fitted into both ends of the yoke 134 and the non-magnetic guide body 140 and further provided with cylindrical bearings 148 in the centers of the side plate 146A and 146B. The bearings 148 are made out of sintered metal, high slidability resign or the like. A rod 150 passing through the magnet 138 and the soft magnetic body 142 is supported by the bearings 148. The side plates 146A and 146B are provided with convex portions 152 which are fitted into the guide bodies 140 and work so as to stop the movement of the magnet 138 by contacting with cushion plates 154A and 154B when the magnet 138 moves. The bearings 148 are made out of magnetic or non-magnetic material.

Referring to FIG. 14, the rod 150 of the magnetic actuator passing through the magnet 138 is supported by the bearings 148 so as to slide along the inner surface of the bearings 148. The magnet 138 therefore becomes stable and is forced to be located in the center of the guide body 140. Further, a holder for integrating the permanent magnets 138A and 138B and the soft magnetic body 142 is not necessary to be covered on the magnets 138A and 138B, and a gap between the outer surfaces of the permanent magnets 138A and 138B and the coils 136A, 136B and 136C can be set to be minimum. As a result, the desirable thrust can be effectively obtained. Moreover, since the magnet 138 does not contact with the guide body 140, the magnet 138 can smoothly move in an axial direction and problems such as frictional wears of the magnet 138 and the guide body 140 can be solved.

Both ends of the rod 150 are supported by the bearings 148 in the magnetic actuator in FIG. 13. However, according to the embodiment of the invention, only one end of the rod 150 may be supported by the single bearing 148.

In the embodiment of the present invention, the moving directions of the coils and the frames of the magnetic actuators 106 for bow correction are substantially parallel with the operating forces applied to the workpiece 92. Therefore the embodiment of the present invention having such layout of the magnetic actuators 106 has following advantageous effects in comparison with a conventional lapping apparatus shown in FIG. 15.

Figure 15:
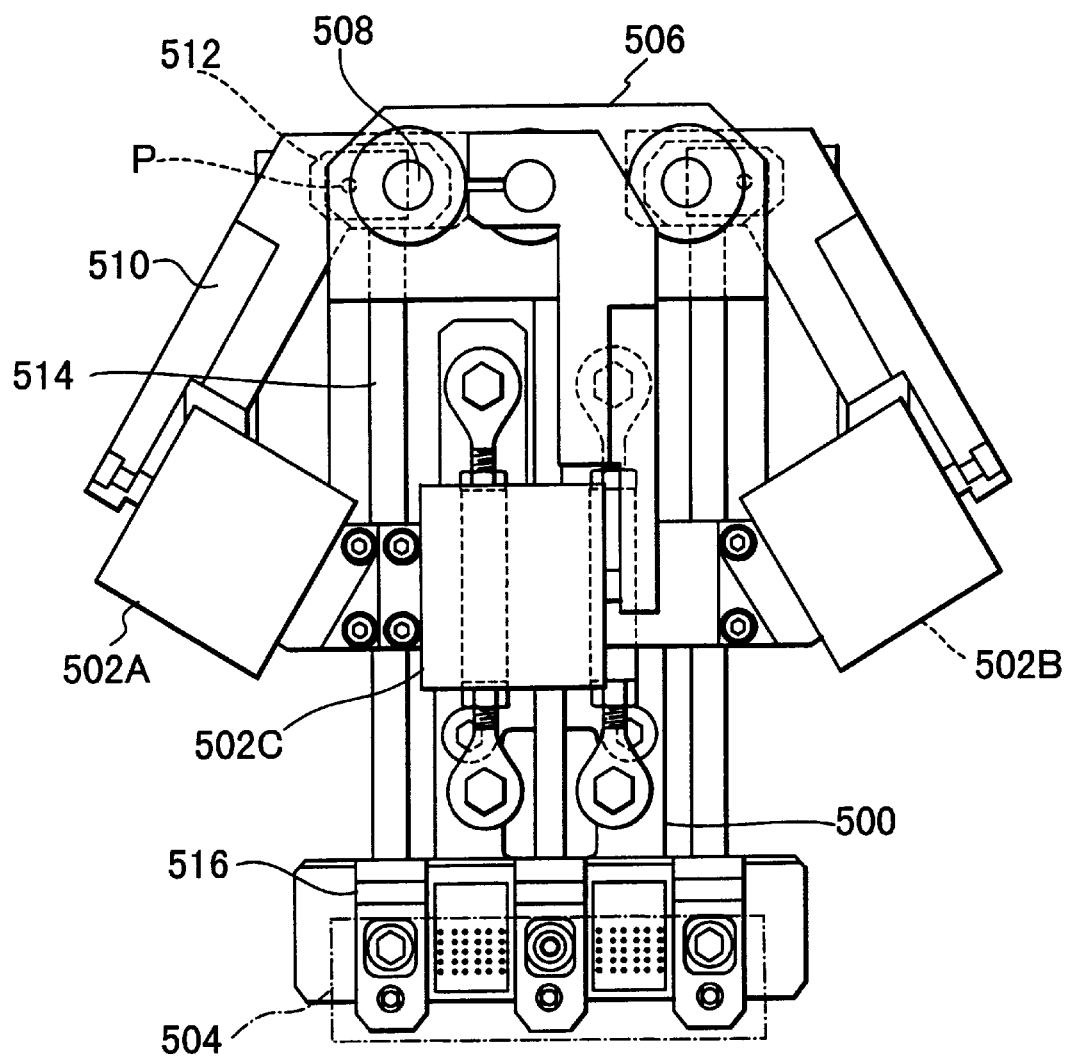
FIG. 15 is a partial front view of a conventional apparatus for lapping magnetic heads.

FIG. 15 is a partial front view of a conventional apparatus for lapping magnetic heads disclosed in the above mentioned U.S. Pat. No. 5,620,356. The lapping apparatus in FIG. 15 is provided with actuators 502A, 502B and 502C for bow correction. The actuators 502A, 502B and 502C respectively work so as to apply necessary operating forces to the left side, the right side and the center of a tool 504 and correct curvature or bow of a workpiece attached on the tool. The actuators 502A, 502B and 502C for bow correction have the same structures, and the structure of the actuator 502A therefore will be only explained here. The actuator 502A is provided so as to apply an operating force to an arm 510 whose one end is connected with a rotating shaft 508 rotatably attached with an upper extending portion 506 of a back plate 500. A non-driven arm 512 is connected with the rotating shaft 508, and an upper end of a lift rod 514 is connected with the rotating shaft 508 at a pivotal point P. The tool 504 is connected with the lower end of the lift rod 514 through a lift member 516.

Figure 16A:
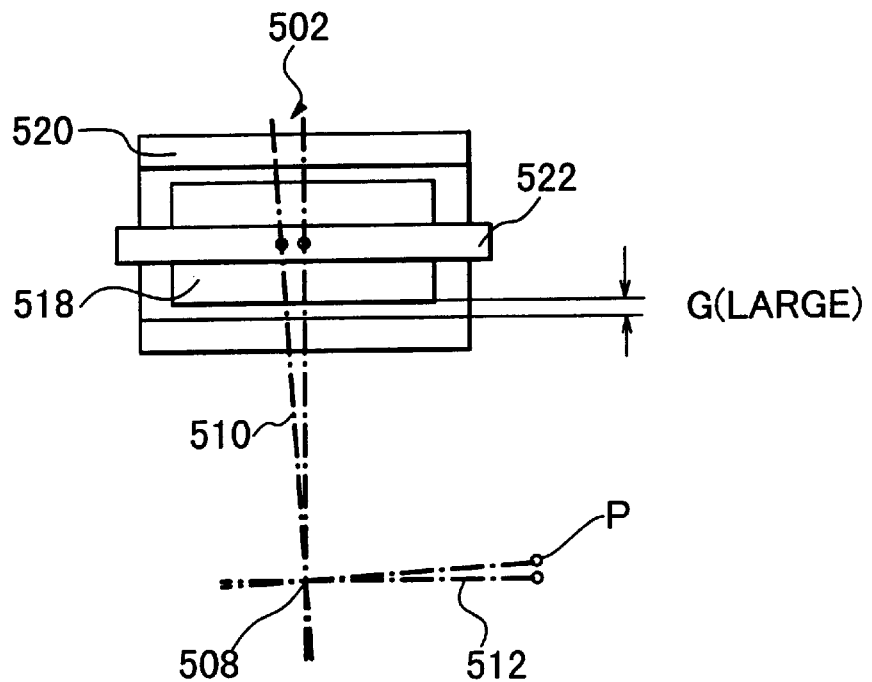
FIG. 16A shows a magnetic actuator used in the first embodiment of the present invention.

In the conventional lapping apparatus shown in FIG. 15, as shown in FIG. 16A, since the arm 510 rotates about the rotating shaft 508, the magnet 518 moves circumferentially when the magnet 518 of the actuator 502 is movable. As a result, a gap G between the magnet 518 and the coil 520 must be set to be relatively large.

Figure 16B:
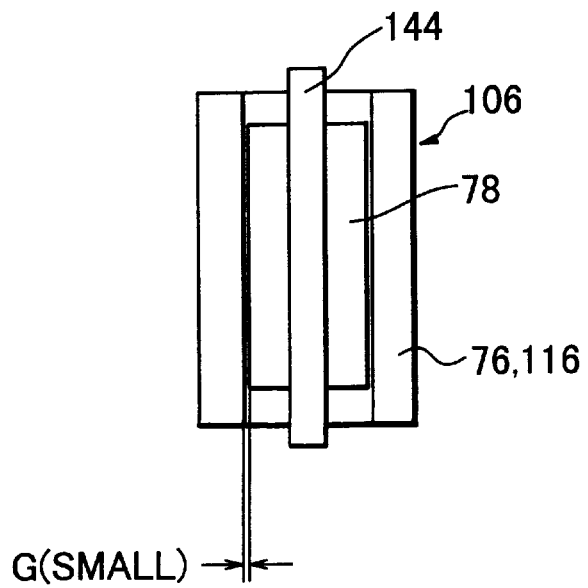
FIG. 16B shows a magnetic actuator used in the conventional lapping apparatus.

On the other hand, according to the embodiment of the present invention, since the moving directions of the coils 76 and the frames 116 of the magnetic actuators 106 for bow correction are substantially parallel with the operating forces applied to the workpiece 92, the movable coils 76 and frames 116 move linearly along the stationary magnets 78. As a result, in the embodiment of the present invention, as shown in FIG. 16B, a gap G between the magnet 78 and the coil can be set to be very small. If the capacity of the magnet of the magnetic actuator of the embodiment is the same as that of the conventional one, the size of the magnetic actuator of the embodiment can become small since the magnetic actuator generates the larger thrust by the smaller gap G.

Figure 17:
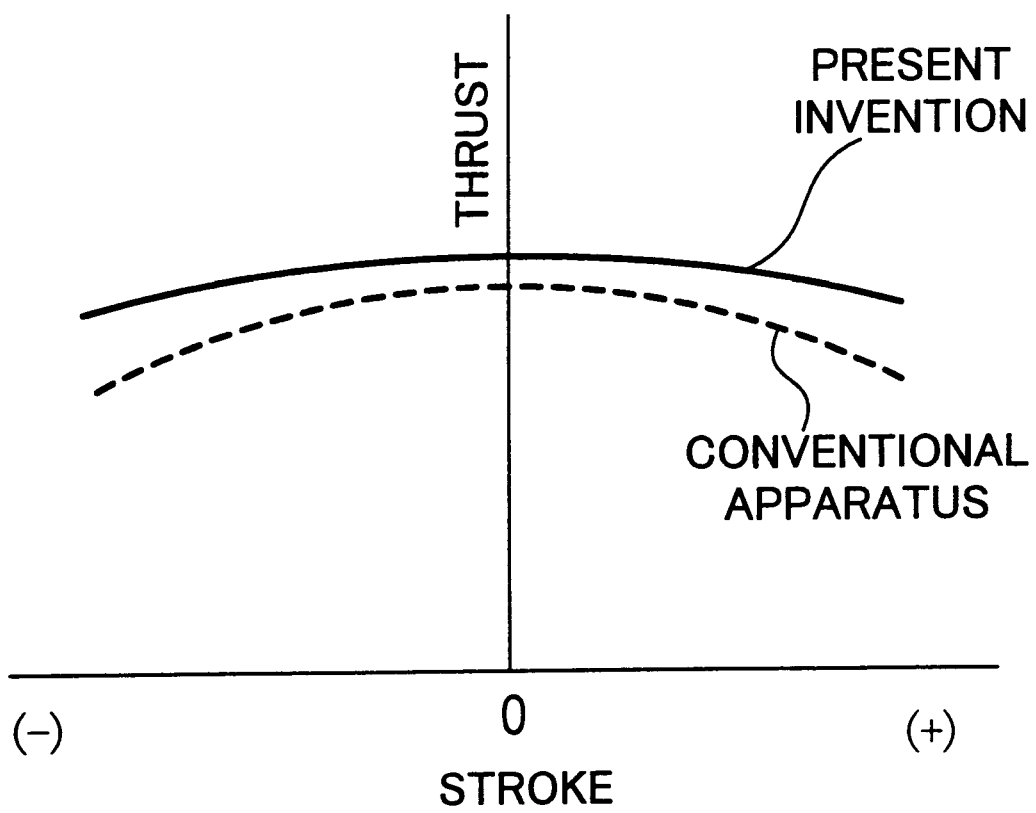
FIG. 17 is a graph showing the relationship between a thrust and a stroke in thrust characteristics of the actuators.

Further, in the conventional lapping apparatus shown in FIG. 15, when the magnet 518 moves circumferentially, the gap G between the magnet 518 and the coil 520 is changed along the stroke of the rod 522. As a result, as shown in FIG. 17, the thrust characteristics along the stroke of the actuator is relatively flat in the lapping apparatus of the embodiment of the present invention and is not flat but curved in the conventional lapping apparatus. Therefore, the lapping apparatus can have better thrust characteristics of the magnetic actuator than the conventional lapping apparatus.

Similarly, the magnetic actuators 70A and 70B for balance correction can have small sizes and good thrust characteristics.

An operation of the lapping apparatus of the first embodiment of the present invention will be explained below.

The tool 94 supporting the workpiece 92 with a plurality of magnetic heads is attached to the lower end portion 90 of the back plate 68, when the lapping head 20 is located outside of the lapping table 2 as shown in FIGS. 1 and 2. Further, the tilting angle of the back plate 68 to the lapping head 20 is set zero at the beginning, that is, the back plate 68 is set to be vertical to the bottom surface of the adjuster ring 26.

Thereafter, the lapping head attaching frame 12 to which the lapping head 20 is attached is linearly moved along the guide rails 8 to the location above the rotary lapping table 2, and the frame 12 is moved downwardly so that the adjuster ring 26 contacts to the abrasive surface 2a of the lapping table 2 with a desirable pushing pressure. Thus, the attitude of the lapping head 20 on the adjuster ring 26 can be controlled based on the abrasive surface 2a of the lapping table 2. As a result, the tilting assembly 46, the lower end portion 90 of the back plate 68 and the tool 94 attached to the lower end portion 90 are set so as to be vertical to the abrasive surface 2a of the lapping table 2.

Then, the pushing pressures or forces are applied to the both right and left sides of the fulcrum shaft 66 on which the lower end portion 90 of the back plate 68 pivots by the magnetic actuators 70A and 70B for balance correction so that the moving directions of the movable portions of the actuators 70A and 70B are substantially parallel with the directions of the pushing pressures or forces. At the same time, the operating forces are applied to the both right and left sides and the center side of the tool 94 by the magnetic actuators 106A, 106B and 106C for bow correction so that the moving directions of the movable portions of the actuators 106A, 106B and 106C are substantially parallel with the directions of the operating forces. Under these conditions, a first lapping process is carried out so as to obtain desirable throat heights of the transducers, which are provided on the longitudinal side surface 104a of the ceramic bar 104, of the thin film magnetic heads on the workpiece 92.

During the first lapping process, for example, when the workpiece 92 is downwardly curved, the downward operating forces are applied to the right and left sides of the tool 94 by the magnetic actuators 106A and 160C for bow correction and the downward operating force is not or little applied to the center of the tool 94 by the magnetic actuator 106b for bow correction so that the bottom surface of the workpiece 92 becomes flat or have no bow. The magnetic actuators 70A and 70B for balance correction work so as to equalize the lapped amounts of the right and left sides of the workpiece 92 by controlling the pushing pressures or forces applied to the right and left sides of the workpiece 92 and so as to push out the workpiece 92 toward the abrasive surface 2a of the lapping table 2.

Further, the adjuster ring 26 is worn at the same portions thereof if the same portions of the adjuster ring 26 continuously contact with the abrasive surface 2a of the lapping table 2. Therefore, during the first lapping process, the rotation support 16 together with the lapping head 20 and the adjuster ring 26 are rotated or oscillated in a predetermined angular range by the motor 32, and at the same time the lapping head attachment frame 12 are reciprocated in a predetermined distance. Thus, during the first lapping process, the lapping head 20 and the adjuster ring 26 have a movement of the combination of rotation and reciprocation.

Referring to FIGS. 7–9, the respective transducers of the thin film magnetic heads are arranged on the longitudinal side surface 104a of the ceramic bar 104 or workpiece 92. The throat heights of the transducers can be detected by measuring the electric resistances of the transducers. Therefore, the first lapping process is carried out while the electric resistances of the transducers are measured in cycles so that the respective throat heights in the magnetic heads are set to have equal and optimum values.

Referring to FIG. 12, after the first lapping process, a second lapping process is carried out by tilting the bottom surface 104b of the ceramic bar 104 of the workpiece 92 by at most about 3 degrees to the abrasive surface 2a of the lapping table 2. Thus, the slant line portion Q in FIG. 12 is lapped off. Namely, the motor 52 is activated to tilt the tilting assembly 46, the back plate 68, the lower end portion 90 of the back plate 68 and the tool 94 so that these components are tilted by at most 3 degrees to the vertical plane to the abrasive surface 2a of the lapping table 2, and then under this condition the bottom surface 104b of the ceramic bar 104 is lapped. During the second lapping process, the right and left contact-type sencors 130 detects the lapped amounts of the workpiece 92. Thereafter, when the lapped amounts detected by the right and left contact-type sensors 130 have reached to predetermined values, the second lapping process is over. During the second lapping process, the lapping head 20 and the adjuster ring 26 have a movement of the combination of rotation and reciprocation as in the first lapping process.

According to the first embodiment of the present invention, following advantageous effects can be obtained.

(1) During the first and second lapping processes, the attitude of the lapping head 20 is controlled with respect to the abrasive surface 2a by the adjuster ring 26. Namely, the attitudes of the lapping head 22, the tilt assembly 30 and back plate 68 can be always controlled based on the abrasive surface 2a of the lapping table 2, and therefore a pushing force other than their weight can be applied to the workpiece 92 so as to lap the workpiece 92. Further, since the attitude of the workpiece 92 can be accurately controlled, the flatness of the bottom surface of the workpiece 92 can be increased and the unevenness of the throat heights of the transducers of the thin film magnetic heads which are attached on the longitudinal side surface 104a can be decreased.

(2) The number of the cylindrical dummies 38 of the adjuster ring 28 is selected based on the weight distribution of the lapping head 20. As a result, the partial wear of the adjuster ring 26 can be avoided. Accordingly, in this aspect, the flatness of the bottom surface of the workpiece 92 is increased.

(3) The lapping head 20 and the adjuster ring 26 have a movement of the combination of rotation and reciprocation. Accordingly, in this aspect, the partial wear of the adjuster ring 26 can be avoided, and the flatness of the bottom surface of the workpiece 92 is increased.

(4) The workpiece 92 or the ceramic bar 104 is attached at only one point with the lower end portion 90 of the back plate 68. Therefore, even if the ceramic bar 104 has been twisted in the rotation direction thereof, the lapping process can be carried out without the correction of the twisting condition and bad quality products are not generated under the twisting condition of the ceramic bar 104. Namely, if the ceramic bar was supported at two points, the ceramic bar 104 should be attached with the back plate 68 with the twisting condition being forcibly corrected. When the ceramic bar 104 is removed from the back plate 68 after lapping, the ceramic bar 104 goes back to the initial twisting condition and has the bad quality.

(5) The relatively lower portion of the back plate 68 is attached on the fulcrum shaft 66. As a result, the lower end portion 90 of the back plate 68 and the tool 92 become stable.

(6) Since the two contact-type sensors 30 indirectly detect the positions of the right and left ends of the tool 94, the lapped amounts and the balance of the lapped amounts of the right and left sides can be detected. By using the detected values, the lapping process can be automatically stopped.

(7) The magnetic actuators 70A and 70B for balance correction and the magnetic actuators 106A, 106B and 106C for bow correction are provided so that the moving directions of the movable parts of the actuators are substantially parallel with the directions of the pushing pressures or forces and/or the operating forces applied by the actuators. As a result, the gaps between the movable parts and the stationary parts of the magnetic actuators become smaller than those in the conventional lapping apparatus, and therefore the magnetic actuators can be downsized and the thrust characteristics can be improved.

A second embodiment of the present invention will be explained with reference to FIGS. 18 and 19.

In the second embodiment of the invention, an adjuster ring 180 is rotatably supported by the lapping head 20, and the adjuster ring 180 is rotated so as to avoid the partial wear. As shown in FIG. 18, a rotation support 16 is rotatably supported by the inner side of the lapping head attaching frame 12 through the circular bearing 14. The lapping head 20 is attached to the rotation support 16 through the resilient member 18 such as a resilient plate or rubber. A large diameter super gear 184 is rotatably attached to the outer circumference of the bottom portion of the lapping head 20 through a circular bearing 182, and the adjuster ring 180 is attached to the spur gear 184. A motor 186 is installed outside of the lapping head attachment frame 12 to rotate the adjuster ring 180, and a spur gear 188 connected to the rotating shaft of the motor 6 is engaged with the spur gear 184 of the adjuster ring 180.

Figure 19:
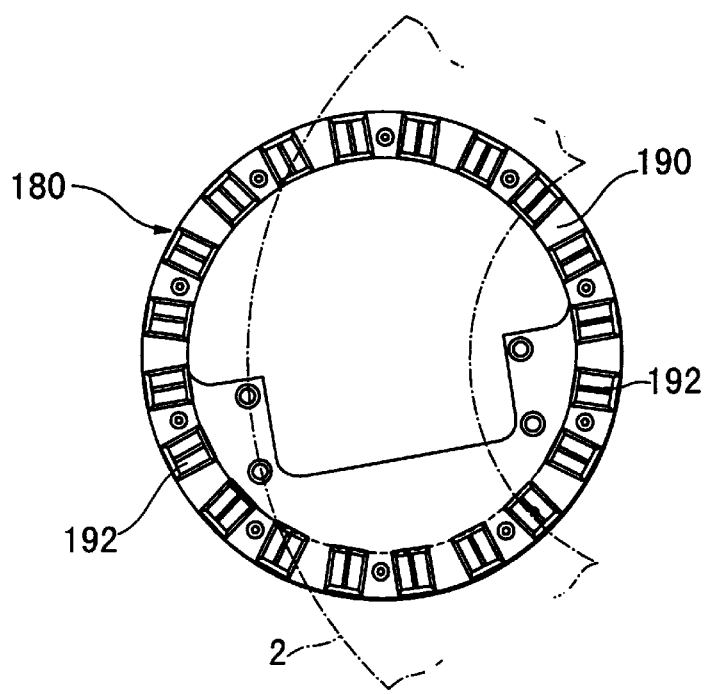
FIG. 19 is a bottom view of an adjuster ring used in the second embodiment of the present invention.

FIG. 19 is a bottom view of the adjuster ring 180. Many abrasion resisting ceramic dummies 192 are buried in an aluminum ring body 190, and the lower ends of the dummies 192 slightly downwardly project from the ring body 190. In the embodiment, the dummies 192 are provided equally since the adjuster ring 180 rotates during the lapping process.

Since there is a little space when the spur gear 184 engages with the spur gear 188, the contact of the adjuster ring 180 with the abrasive surface 2a of the lapping table 2 is not disturbed. Since the lapping head 20 is attached to the rotation support 16 through the resilient member 18, the bottom plate 22 of the lapping head 20 can be closely set on the adjuster ring 180, the attitude of the lapping head 20 is based on the adjuster ring 180, that is, based on the abrasive surface 2a of the lapping table 2.

Figure 18:
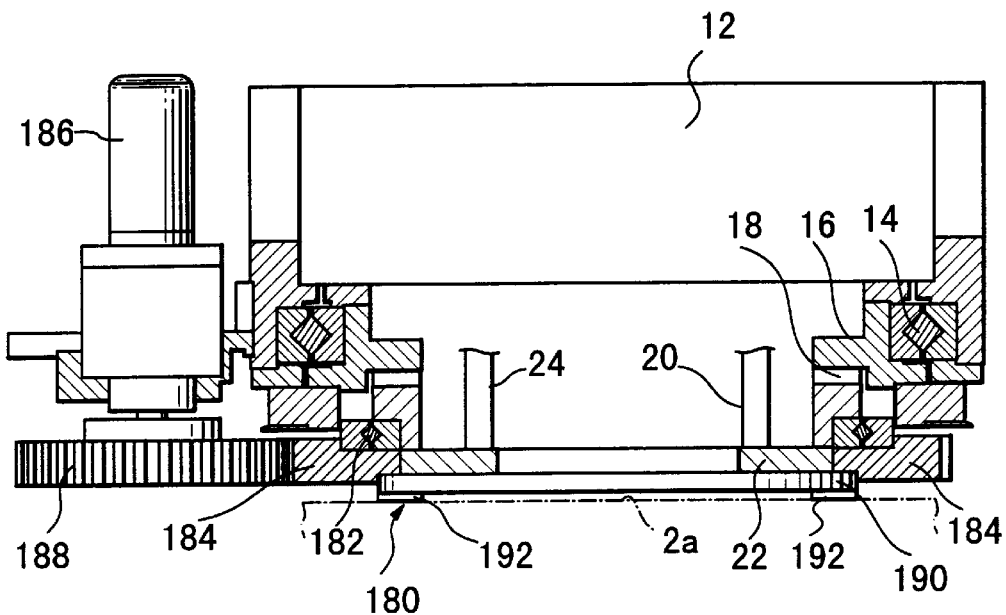
FIG. 18 is a partial sectional front view of a second embodiment of the present invention.

Other structures of the second embodiment in FIGS. 18 and 19 are substantially the same as those in the first embodiment in FIGS. 1–17.

According to the second embodiment in FIGS. 18 and 19, the lapping head 20 is oscillated or rotated in the predetermined angular range while the adjuster ring 180 is rotated by the motor 186 through the gears. Therefore, the partial wear of the adjuster ring 180 can be avoided, and the good flatness can be obtained in the lapping process.

The rotating speed and rotating direction of the lapping table 2 can be changed, and the temperature of the lapping table 2 can be controlled to be stable.

In the second embodiments explained above, the lapping head is oscillated or rotated in the predetermined angular range so as to prohibit the cables connected to the motors and actuators attached on the lapping head from being twisted and finally being cut. However, when a power supply means such as a slip ring is provided so as to supply the power to the motors and the actuators, the lapping head may be continuously rotated.

A third embodiment of the present invention will be explained with reference to FIGS. 20 and 21.

In the third embodiment of the invention, the magnetic actuators for balance correction are arranged in a different manner and other structures are substantially the same as those in the embodiments explained above.

Figure 20:
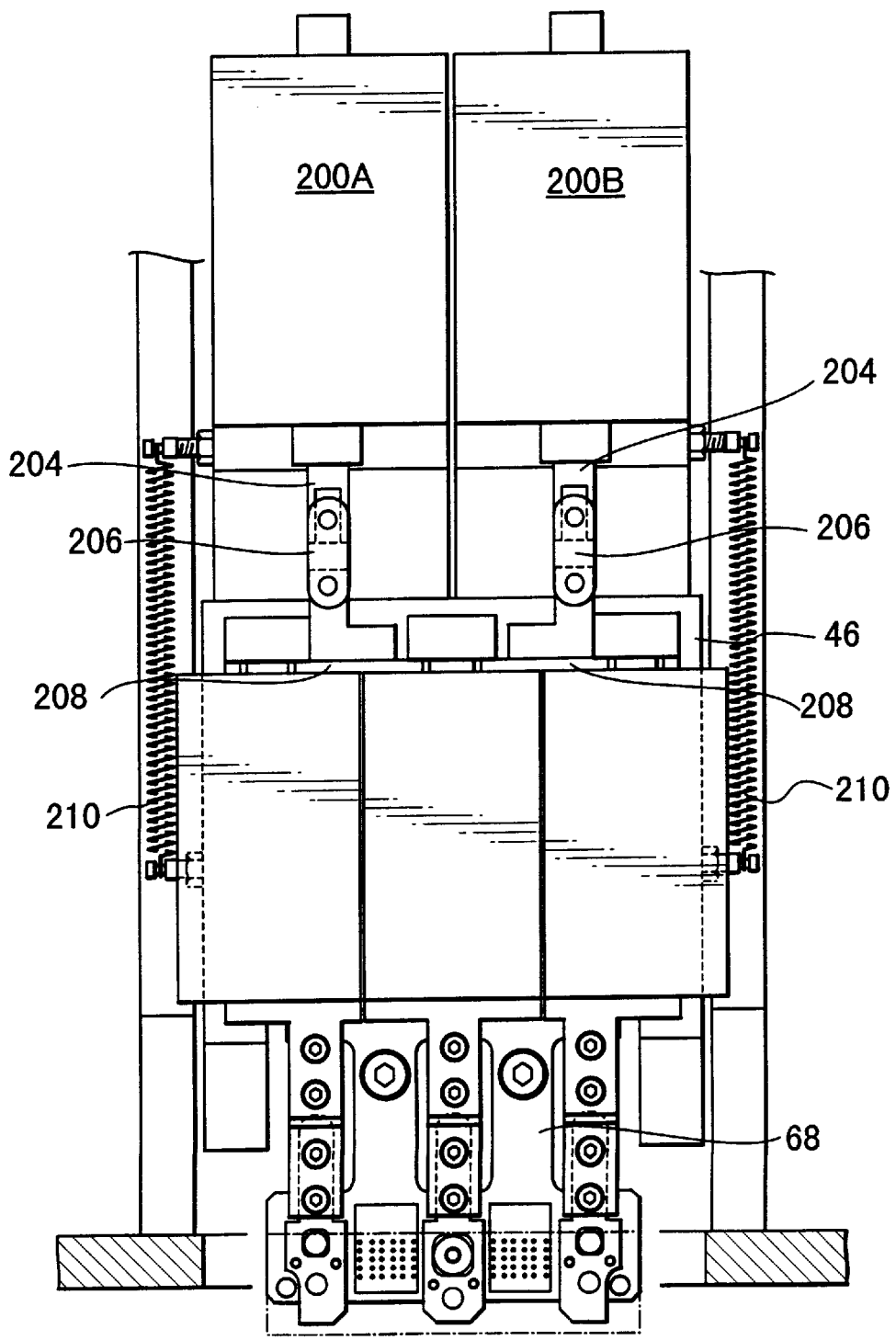
FIG. 20 is a partial front view of a third embodiment of the present invention.
Figure 21:
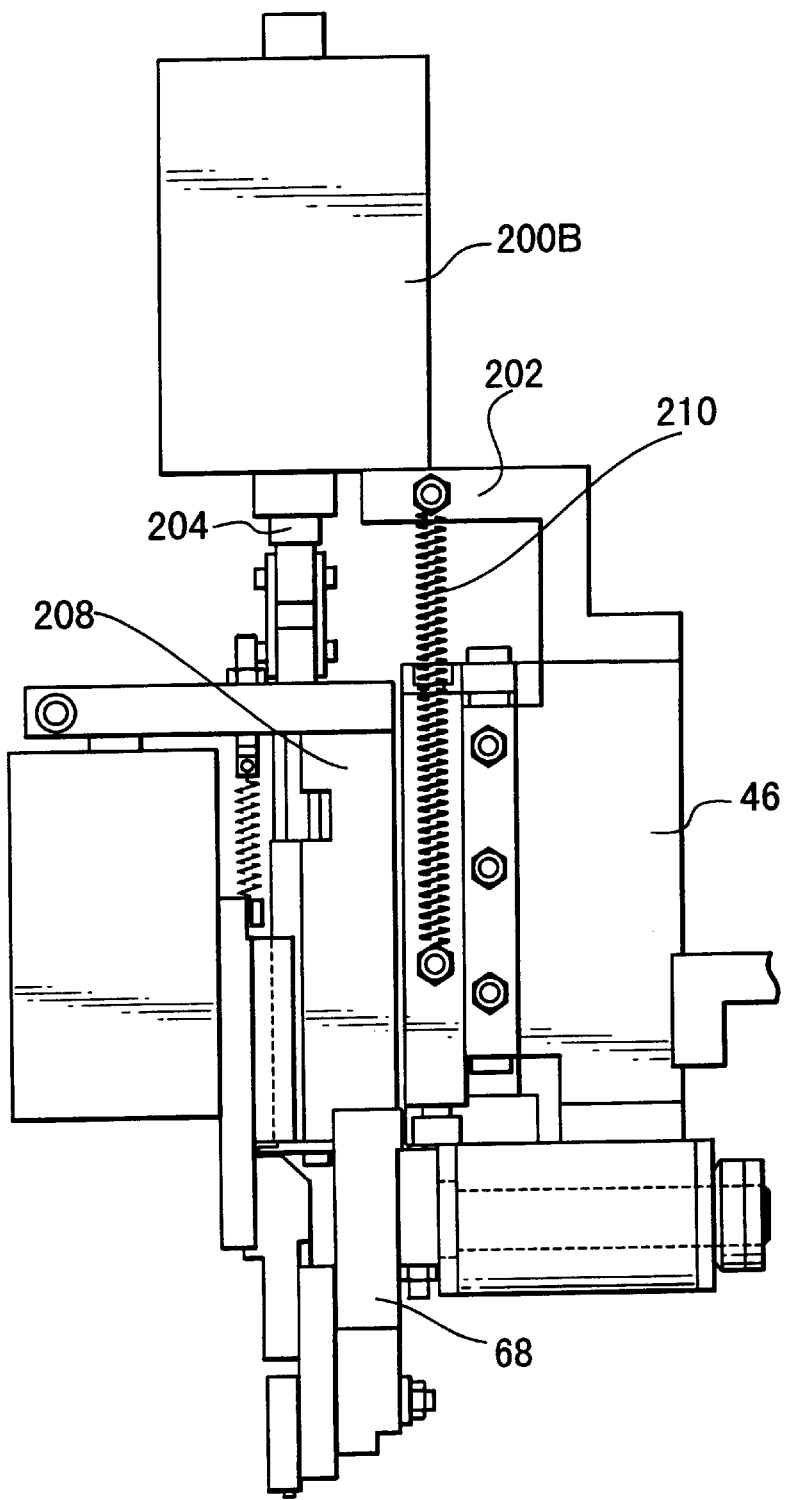
FIG. 21 is a sectional side view of FIG. 19.

Referring to FIGS. 20 and 21, magnetic actuators 200A and 200B for balance correction are attached to the tilting assembly 46 through brackets 202. Respective lower ends of rods 204 of the actuators 200A and 200B are straightly connected through brackets 206 with right and left upper extended portions 208 of the back plate 68. Spring members 210 respectively connect the brackets 202 with the lift assembly 64 so that the biasing forces of the spring members 210 can cancel the weights of the movable parts of the actuators 200A and 200B.

In the third embodiment, the moving directions of the moving parts of the magnetic actuators 200A and 200B for balance correction are substantially parallel to those of the pushing pressures or forces applied to the back plate 68. Further, since the lower ends of rods 204 of the actuators 200A and 200B are straightly connected through brackets 206 with right and left upper extended portions 208 of the back plate 68, the number of the components can be deceased in comparison with the first embodiment in FIGS. 1–17.

A fourth embodiment of the present will be explained with reference to FIGS. 22 and 23. In the fourth embodiment, the magnetic actuators for balance correction explained above is divided into a magnetic actuator for controlling load and a magnetic actuator for adjusting balance. Other structures of the fourth embodiment in FIGS. 22 and 23 are substantially the same as those in the embodiments explained above.

Figure 22:
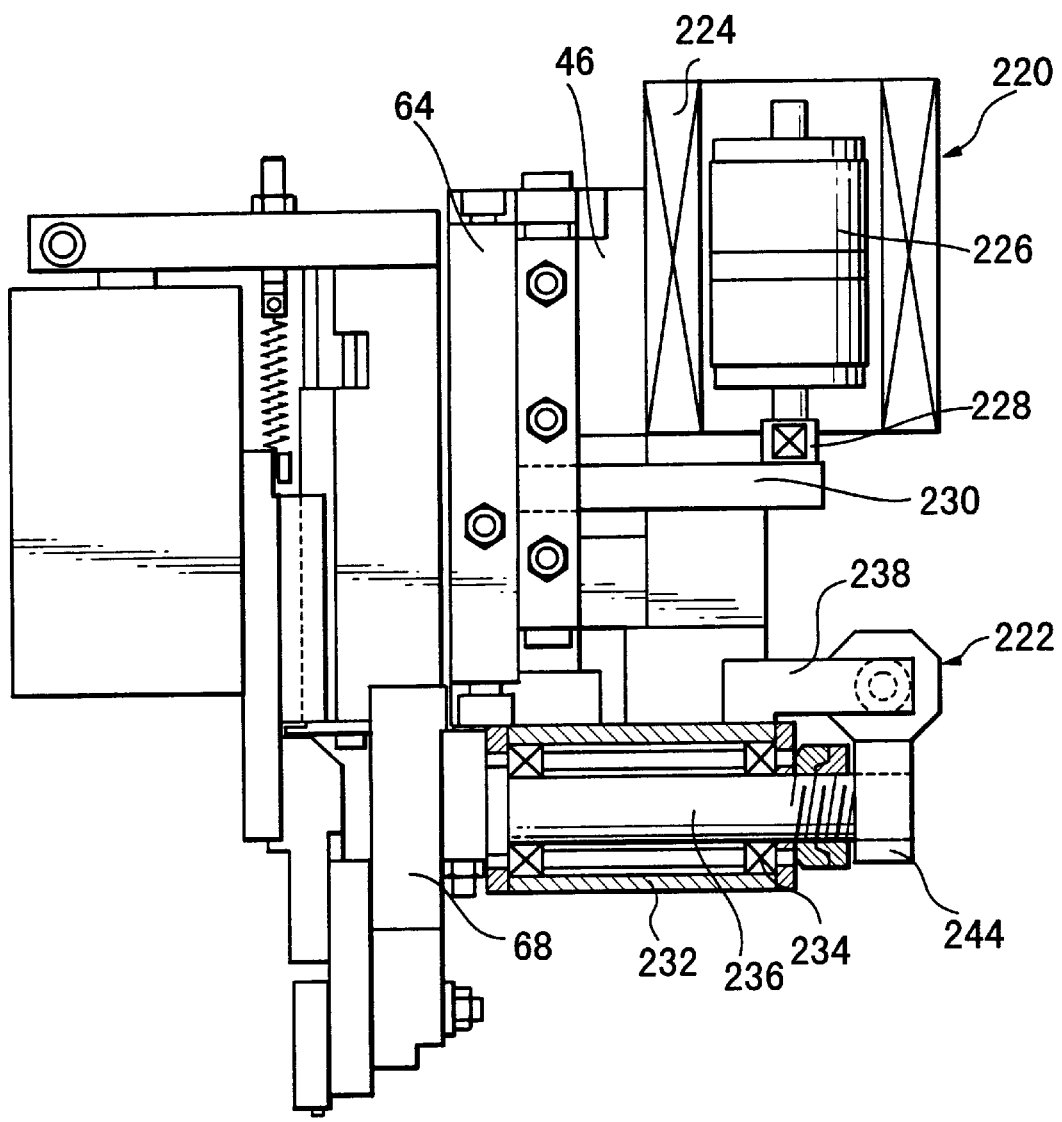
FIG. 22 is a partial sectional side view of a fourth embodiment of the present invention.
Figure 23:
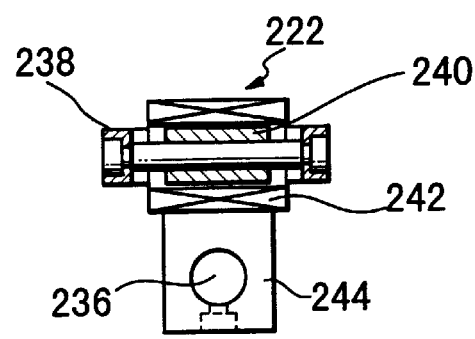
FIG. 23 is a back view showing an actuator for balance correction according to the fourth embodiment of FIG. 22.

Referring to FIGS. 22 and 23, a magnetic actuator 220 for controlling load and a magnetic actuator 222 for adjusting balance are respectively provided both of which work as the magnetic actuators 70A and 70B. The stationary parts (coils and a frame) of the actuator 220 for controlling load is secured to the tilting assembly 46, and the movable part (a magnet) of the actuator 220 is secured to a rod 228 and one end of a horizontally extending bracket 230. Other end of the bracket 230 is attached to the lift assembly 64. The lift assembly 64 is connected with the back plate 68, and the actuator 220 therefore can control a load applied to the back plate 68 thereby.

A bearing housing 232 is attached to the lower portion of the tilting assembly 46 and is provided with a rotatable shaft 236 on a bearing 234. The front end (left side in FIG. 23) of the shaft 236 is secured to the back plate 68 so that the shaft 236 rotates together with the back plate 68. A bracket 238 is fixed on the upper side of the bearing housing 232, and the magnetic actuator 222 for adjusting balance is connected with the bracket 238. The actuator 222 is provided with a magnet 240 and a coil 242. The magnet 240 is connected with the bracket 238 so as to be stationary, and the coil 242 is connected with a lever 244 fixed to the rear end (right side in FIG. 23) of the shaft 263 so as to be horizontally movable. When the coil 242 of the actuator 222 moves in the right or left direction, the lever 244 rotates in a necessary angle, the back plate 68 rotates about fulcrum shaft 66 through the rotation of the shaft 263, and the balance of the right and left sides of the back plate 68 is finally controlled.

According to the fourth embodiment of the present invention, the magnetic actuator 220 for controlling load and the magnetic actuator 222 for adjusting balance are separately provided instead of the magnetic actuators 70A and 70B. The control of the load applied to the back plate 68 and the adjustment of the balance of the back plate 68 therefore can be accurately carried out.

A fifth embodiment of the present invention will be explained with reference to FIGS. 24–30. In the fifth embodiment, low-friction type cylinders 330A–330E for bow correction are used instead of the magnetic actuators for bow correction, explained in the first to fourth embodiments, so as to apply the operating forces to the tool supporting the workpiece. Further, in the fifth embodiment, a tool 300 having five points or locations to which operating forces for bow correction are applied is used instead of the tool 94 having three points or locations, explained in the first to fourth embodiments. Other structures of the fifth embodiment are substantially the same as those in the first to fourth embodiments.

Figure 24:
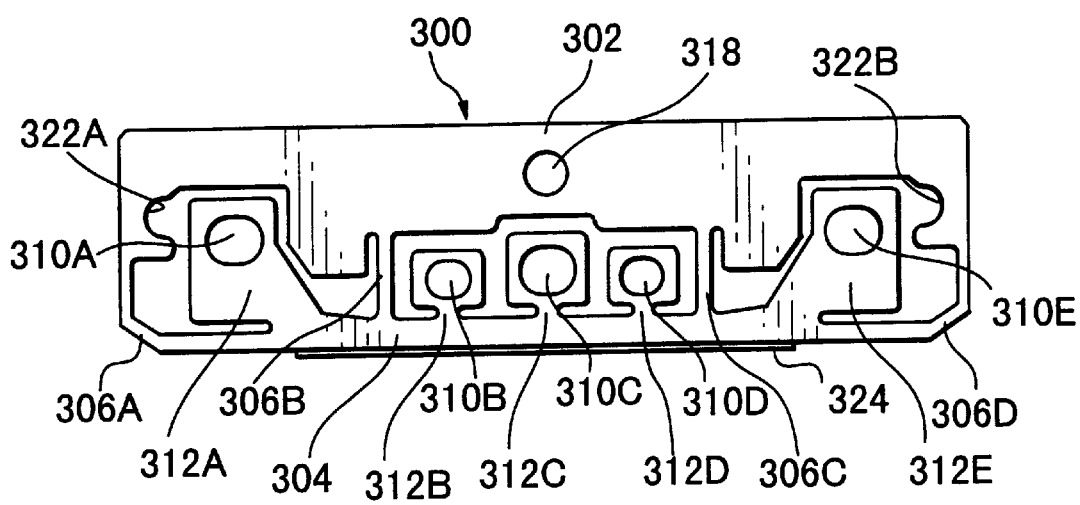
FIG. 24 is an enlarged front view of a tool which is used in a lapping apparatus according to a fifth embodiment of the present invention.

First, the tool 300 will be explained in detail with reference to FIG. 24. Referring to FIG. 24, the tool 300 is comprised of a body portion 302, a supporting portion 304 for supporting the workpiece 92, four connecting portions 306A–306D, five correction holes 310A–310E through which five correction pins 308A–308E are inserted and which are connected with the supporting portion 304 and five arm portions 312A–312E connecting the correction holes 310A–310E with the supporting portion 304. The correction hole 310C is formed on the center of the longitudinal direction of the tool 300, and the other four correction holes 310A, 310B, 310D and 310E are formed on the tool 300 symmetrically with respect to the correction hole 310C in the right and left directions.

The tool 300 is further comprised of a fixing hole 318, located on the center of the longitudinal direction and on an upper side of the vertical direction thereof, through which a screw 316 is inserted to connect the body portion 302 with the fixing pin 314. The body portion 302 is provided with engaging portions 322A and 322B with which positioning pins 320A and 320B are engaged so as to position the tool 300.

The supporting portion 304 of the tool 300 has an elongated beam structure which can be bent by operating forces of lift members 326A–326E. A workpiece fixing portion 324 is formed on the lowest end surface of the supporting portion 304, and the workpiece 92 is adhered on the bottom surface of the workpiece fixing portion 324.

In the fifth embodiment, the five lift members 326A–326E apply the operating forces through the correction pins 310A–310E to the supporting portion 304 of the tool 300 or the workpiece 92. The operating points or locations therefore becomes five points or locations and a five-point bend of the tool 300 can be therefore obtained.

The structure of the apparatus for lapping magnetic heads of the fifth embodiment will be explained with reference to FIGS. 25–29.

Referring to FIGS. 25–29, five low-friction type cylinders 330A–330E for bow correction are provided in a line to apply operating forces through lift members 326A–326E to correction pins 308A–308E. Each of these low-friction type cylinders 330A–330E is comprised of a tube 332, a piston (not shown) and a rod 334. The piston and the rod 334 are linearly movable in an axial direction within the tube 332. Further, the low-friction type cylinders 330A–330E for bow correction reduce sliding resistances or frictions of the pistons and employ metal seal structures on sliding portions thereof so that a low friction can be obtained.

Figure 25:
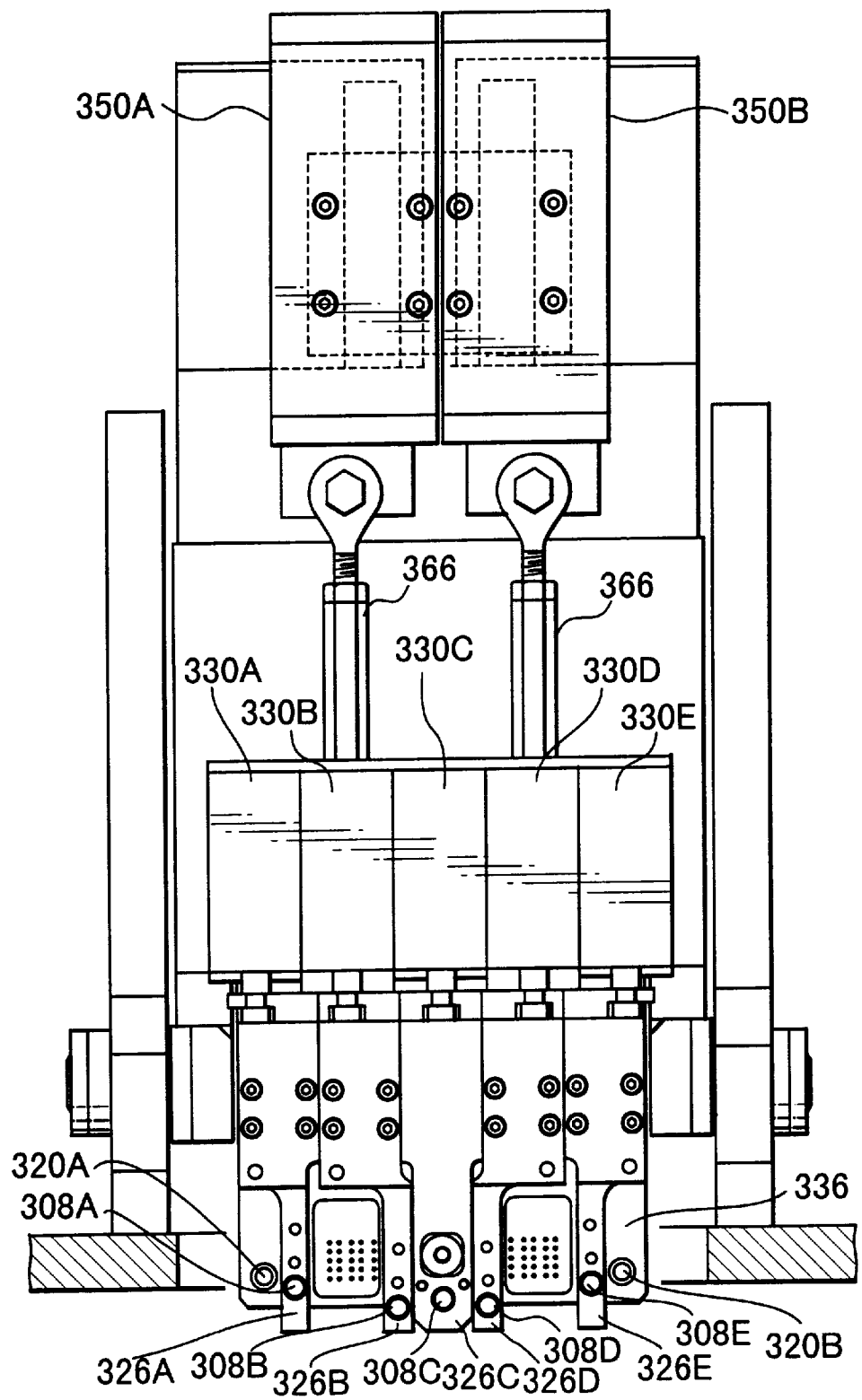
FIG. 25 is a partial front view of the lapping apparatus according to the fifth embodiment of the present invention.
Figure 28:
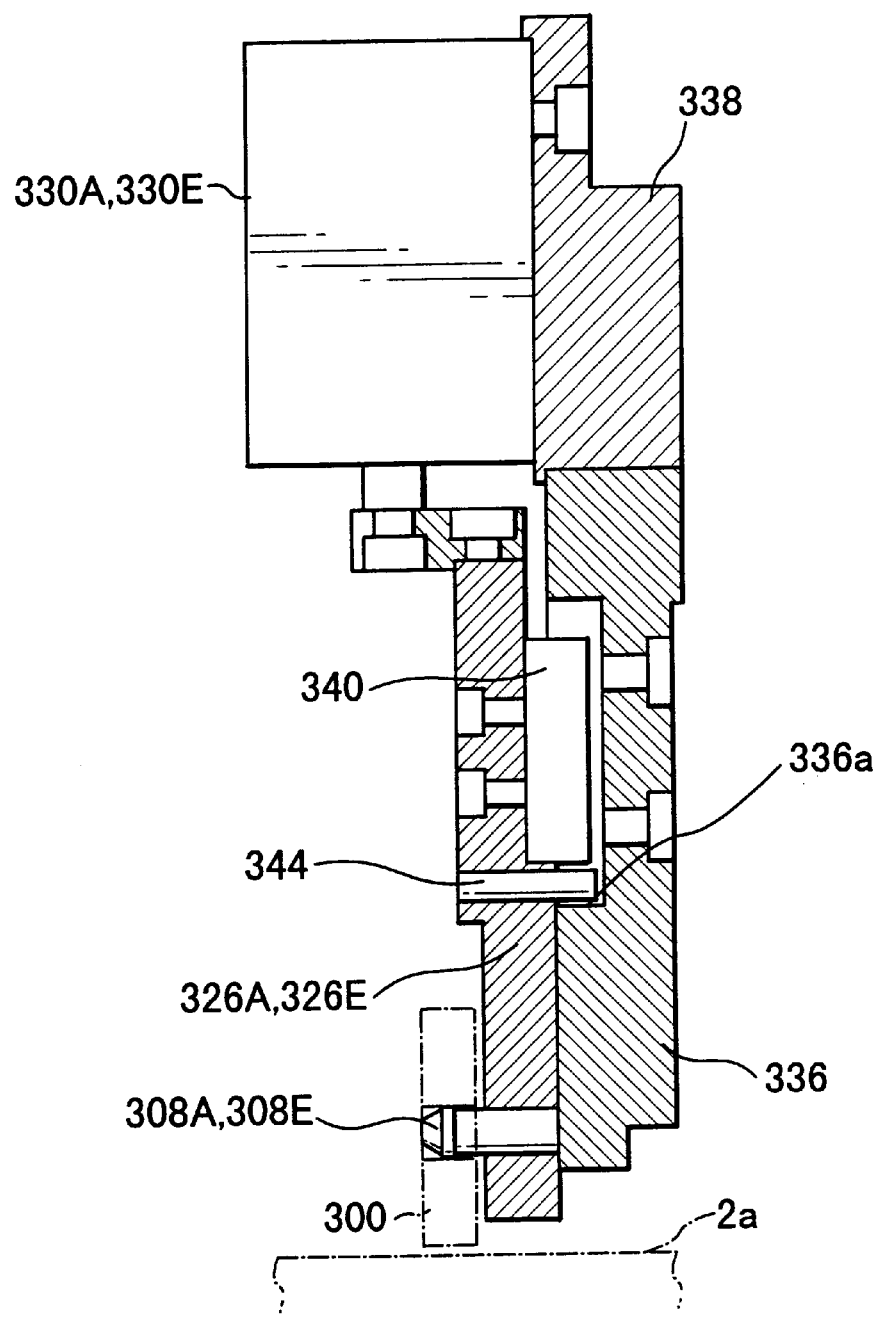
FIG. 28 is a partial sectional side view of a bow correction actuator cut at the position of a bow correction pin 308A or 308E located at the left or right side of the tool according to the fifth embodiment of the present invention.

Referring to FIGS. 25 and 28, the low-friction type cylinders 330A and 330E for bow correction work so as to apply operating forces to the correction pins 308A and 308E of the tool 300. A back plate 336 is integrally provided with an upper extended portion 338 located on the upper side thereof The tubes 332 of the low-friction type cylinders 330A and 330E for bow correction are respectively fixed on the front surface (the left side surface in FIG. 28) of the upper extended portion 338 of the back plate 336. Slide bearings 340 are attached on the front side of the back plate 336. The rods 334 are respectively provided within the tubes 332 of the low-friction type cylinders 330A and 330E for bow correction. The rods 334 are linearly movable in the up and down directions. Namely, the lift members 326A and 326E for bow correction are integrally attached to the lower end of the rods 334, and the lift members 326A and 326E are respectively provided so as to move or slide along the slide bearing 340. The lift members 326A and 326E are provided with stopper pins 344 whose one portions project into a space between the slide bearing 340 and a horizontally flat portion 336a of the back plate 336. The stopper pins 344 restrict the undesirable movement of the lift members 326A and 326E. In FIG. 25, the tool 300 is not shown to be easily understandable. Further, referring to FIG. 28, the lift members 326A and 326E for bow correction can move up and down in a space between the back plate 336 and the tool 300 attached to the back plate 336. Bow correction pins 308A and 308E are secured to the lower ends of the lift members 326A and 326E and are fitted into correction holes 310A and 310E of the tool 300. When the rods 334 of the low-friction type cylinders 330A and 330E for bow correction move up and down, operating forces are applied to the correction pins 308A and 308E through the lift members 326A and 326E. As a result, the supporting portion 304 of the tool 300 is bent and the heights of the workpiece 92 corresponding to the locations of the correction pins 308A and 308E can be minutely changed. The moving directions of the rods 334 of the low-friction type cylinders 330 for bow correction are substantially parallel with the direction of the operating force applied to the workpiece 92.

Figure 29:
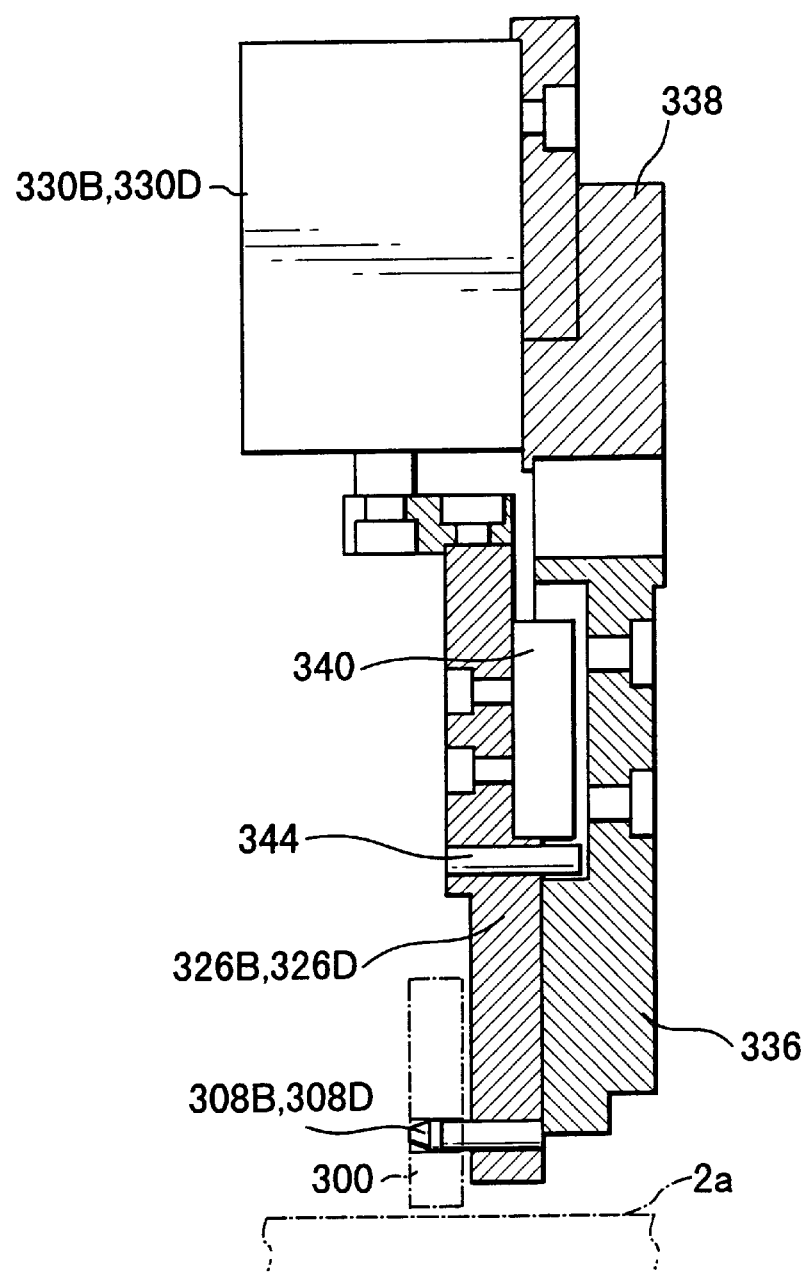
FIG. 29 is a partial sectional side view of a bow correction actuator cut at the position of a bow correction pin 308B or 308d located at the left or right side of the tool according to the fifth embodiment of the present invention.

Referring to FIGS. 25 and 29, the low-friction type cylinders 330B and 330D for bow correction work so as to apply operating forces to the correction pins 308B and 308d of the tool 94. The low-friction type cylinders 330B and 330D basically have the same structures as those of the low-friction type cylinders 330A and 330E explained above. The lift members 326B and 326D for bow correction are integrally attached to the lower end of the rods 334, and operating forces are applied by the low-friction type cylinders 330B and 330D to the correction pins 308B and 308D through the lift members 326B and 326D. As a result, the supporting portion 304 of the tool 300 is bent and the heights of the workpiece 92 corresponding to the locations of the correction pins 308B and 308D can be minutely changed. The correction pins 208B and 308D have different sizes and locations from the correction pins 208A and 208E.

Figure 26:
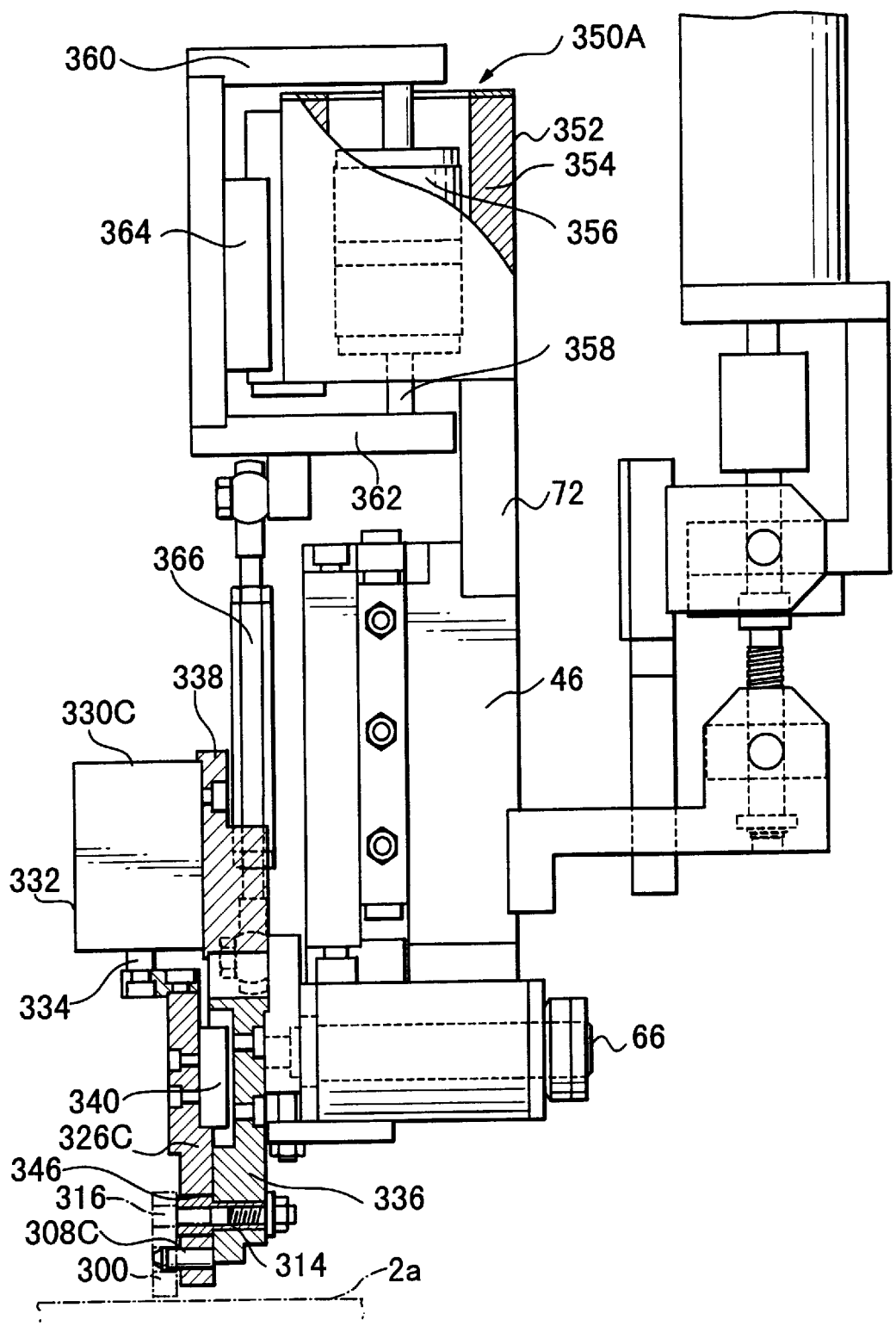
FIG. 26 is a sectional side view of the lapping apparatus cut at the position of a bow correction pin 308C located at the center of the tool according to the fifth embodiment of the present invention.

Referring to FIGS. 25 and 26, the low-friction type cylinder 330C for bow correction works so as to apply an operating force to the correction pin 308C of the tool 94. The low-friction type cylinder 330C basically has the same structure as those of the low-friction type cylinders 330A, 330B, 330D and 330E explained above. The lift member 326C for bow correction are integrally attached to the lower end of the rods 334, and the lift member 326C is provided with a through hole 346 on its lower end. The fixing pin 314 secured to the back plate 336 is inserted into the through hole 346 and the front end of the fixing pin 314 is further inserted into the fixing hole 318 of the tool 300. The tool 300 is fixed to the back plate 336 by the screw 316 being attached to the fixing pin 314. The through hole 346 has a larger diameter by a predetermined value than that of the fixing pin 314 so as to restrict the undesirable up and down movement of the lift member 326C. Therefore, the lift member 326C is not provided with the stopper pin 344. An operating force is applied through the lift member 326C by the low-friction type cylinder 330C to the correction pin 308C. As a result, the supporting portion 304 of the tool 300 is bent and the height of the workpiece 92 corresponding to the location of the correction pin 308C can be minutely changed.

Figure 27:
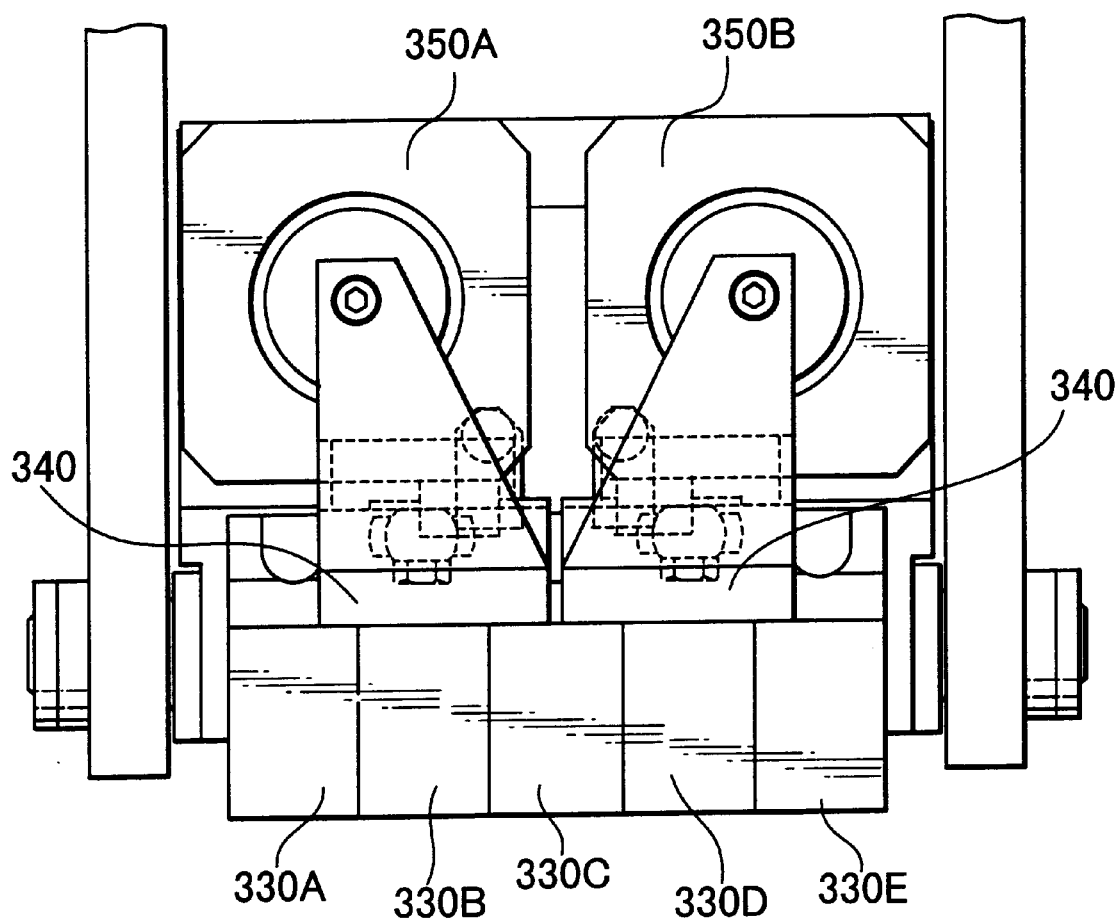
FIG. 27 is a partial plan view of the lapping apparatus according to the fifth embodiment of the present invention.

Referring to FIGS. 25–27, the apparatus for lapping magnetic heads is provided with magnetic actuators 350A and 350B for balance correction. The magnetic actuators 350A and 350B basically have the same structures as those of the magnetic actuators in FIGS. 3 and 5. Namely, The magnetic actuators 350A and 350B are connected through the bracket 72 to the upper end of the tilt assembly 46. The magnetic actuators 350A and 350B are provided to push downwardly the right and left sides of the back plate 68 with respect to the fulcrum shaft 66 and to control the load applied on the back plate 68. The magnetic actuators 350A and 350B for balance correction are respectively provided with frames 352, stationary coils 354 attached to the insides of the frames 352, movable magnets 356 installed at the centers of the frames 352 and movable rods 358 integrally connected with the centers of the magnets 356.

The upper and lower ends of the rods 358 of the actuators 350A and 350B are respectively connected with lift members 360 and 362 which are movable up and down along slide bearings 364 fixed to the frames 352 of the actuators 350A and 350B. The lower portions of the lift members 362 are respectively connected with the right side and the left side of the back plate 68 through connecting links 366. Pivotal points on the back plate 68 of the right and left connecting links 366 are R and L (not shown). Thus, the moving directions of the magnets 356 of the magnetic actuators 350A and 350B for balance correction are substantially parallel to the directions of the pushing pressures or forces applied to the back plate 68.

The operation of the apparatus for lapping magnetic heads according to the fifth embodiment of the present invention will be explained. The operation of the lapping apparatus is basically the same as that of the first embodiment of the invention. In the first embodiment, some of the throat heights in a longitudinal direction of the magnetic heads or the workpiece might not be within the desirable ranges. Namely, according to the first embodiment, the magnetic actuators 106A–106C apply the operating forces vertically to the three locations of the supporting portion 252 of the tool 94, and the supporting portion 252 of the tool 94 is therefore bent to have an approximate fourth degree curve pattern. Therefore, in the first embodiment, only the throat heights having such fourth degree curve pattern can be corrected. However, the ceramic bar 104 or the workpiece 92 is actually required to be corrected by using a complicated pattern such as a sixth or greater than sixth degree curve pattern.

In order to resolve such problem, the lapping apparatus of the fifth embodiment is provided with five low-friction cylinders 330A–330E of bow correction and the cylinders 330A–330E apply operating forces through the five correction pins 308A–308E to the five locations of the supporting portion 304 of the tool 300. As a result, the supporting portion 304 of the tool 300 or the ceramic bar 104 of the workpiece 92 can be bent in a sixth degree curve pattern and the complicated correction therefore can be carried out.

Further, in the fifth embodiment, the low-friction cylinders 330A–330E of bow correction are employed instead of the magnetic actuators for bow correction. Therefore, larger operating forces can be obtained by using the low-friction cylinders 330A–330E with more compact structures in comparison with the magnetic actuators.

On the other hand, there is a conventional lapping apparatus in which the tool is supported at one point and one operating force is applied to the one point so as to correct the bow of the workpiece. In this conventional lapping apparatus, reaction forces from the abrasive surface are applied between the both ends and the one point of the supporting portion of the tool so as to cause bends and such bends can not be corrected. Such problem can be resolved by the fifth embodiment of the present invention by using the complicated curve pattern.

Figure 30:
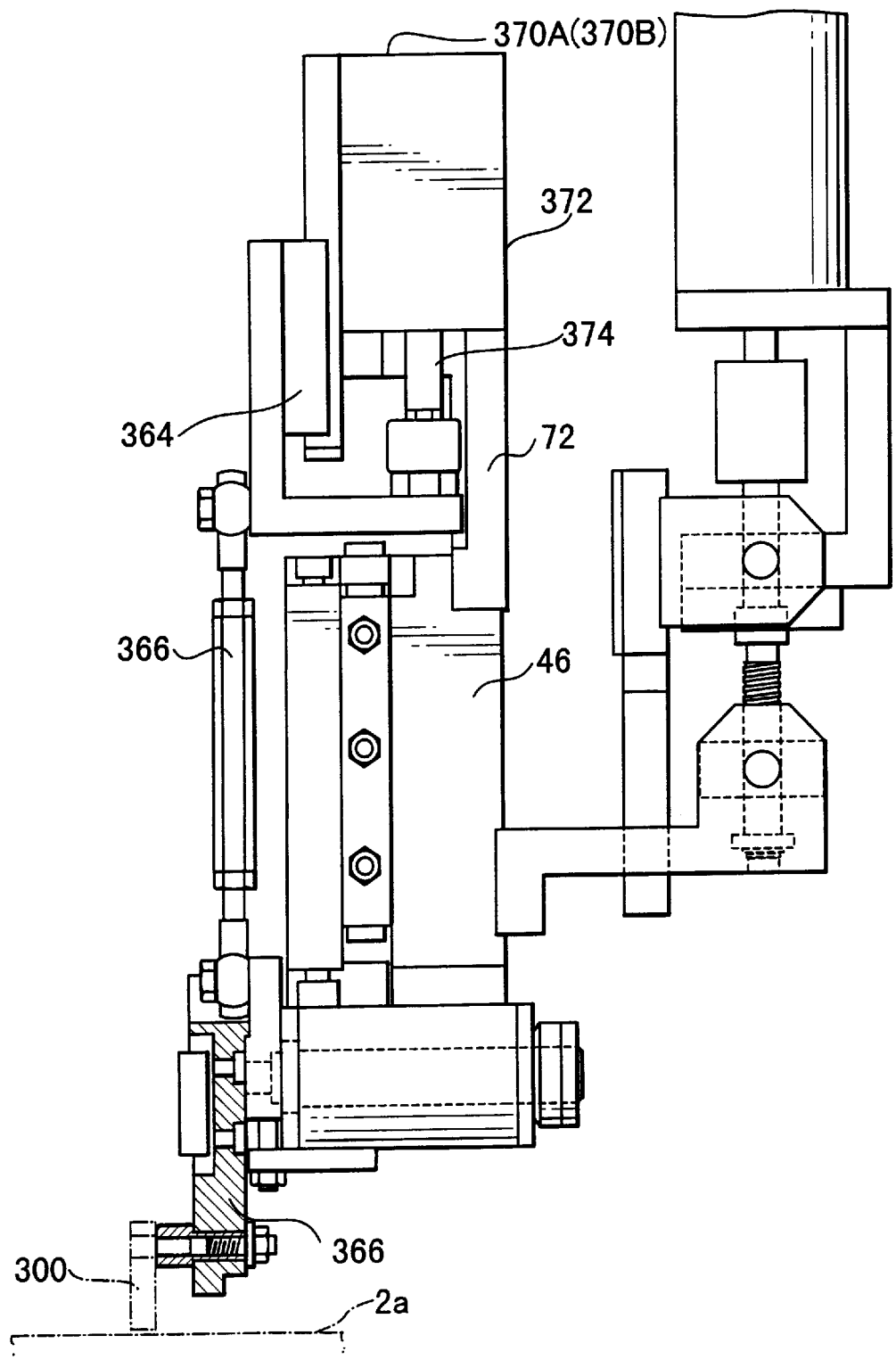
FIG. 30 is a sectional side view of the lapping apparatus according to another example of the fifth embodiment of the present invention.

Another example of the fifth embodiment of the present invention will be explained with reference to FIG. 30. Referring to FIG. 30, low-friction cylinders 370A and 370B for balance correction are employed instead of the magnetic actuators 350A and 350B. The low-friction cylinders 370A and 370B are respectively provided with tubes 372, pistons (not shown) and rods 374 and have basically the same structures as those of the low-friction cylinders 330A–330E. Other structures of the lapping apparatus in FIG. 30 are the same as those of the lapping apparatus in FIG. 26. According to the lapping apparatus in FIG. 30, larger forces can be obtained by using the low-friction cylinders 370A and 370B with more compact structures in comparison with the magnetic actuators.

A sixth embodiment of the present invention will be explained with reference to FIGS. 31–34. In the sixth embodiment, low-friction type cylinders 408A–408G for bow correction are used instead of the magnetic actuators for bow correction, explained in the first to fourth embodiments, so as to apply the operating forces to the tool supporting the workpiece. Further, in the sixth embodiment, a tool 380 having seven points or locations to which operating forces for bow correction are applied is used instead of the tool having three or five points or locations, explained above. Other structures of the sixth embodiment are substantially the same as those in the fifth embodiment.

Figure 31:
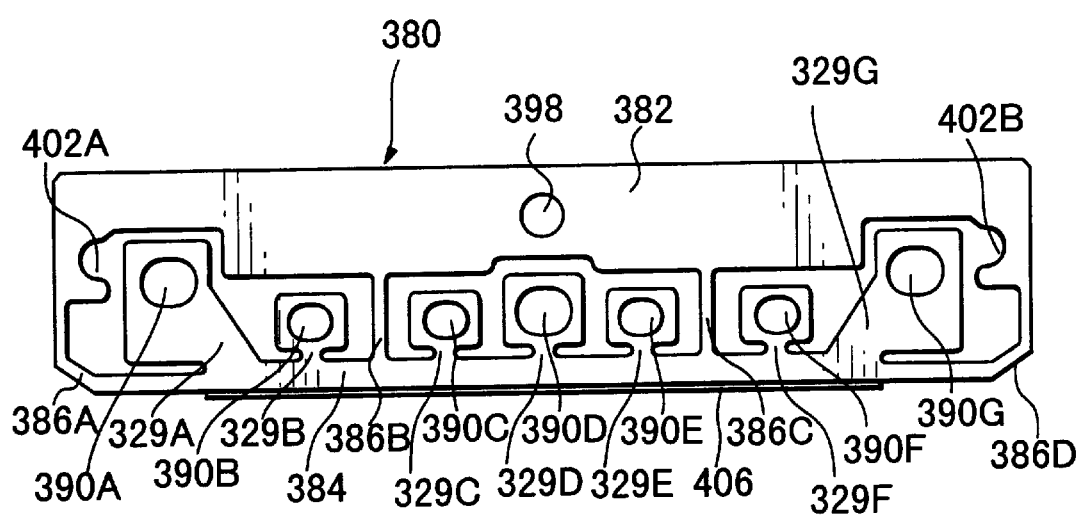
FIG. 31 is an enlarged front view of a tool which is used in the lapping apparatus according to a sixth embodiment of the present invention.

First, the tool 380 will be explained in detail with reference to FIG. 31. Referring to FIG. 31, the tool 380 is comprised of a body portion 382, a supporting portion 384 for supporting the workpiece 92, four connecting portions 386A–386D, seven correction holes 390A–390G through which seven correction pins 388A–388G are inserted and which are connected with the supporting portion 384 and arm portions 392A–392G connecting the correction holes 390A–390G with the supporting portion 382. The correction hole 390D is formed on the center of the longitudinal direction of the tool 380, and the other six correction holes 390A, 390B, 390C, 390E, 390F and 390G are formed on the tool 380 symmetrically with respect to the correction hole 390D in the right and left directions.

The tool 380 is further comprised of a fixing hole 398, located on the center of the longitudinal direction and on an upper side of the vertical direction thereof, through which a screw 396 is inserted to connect the body portion 382 with a fixing pin 394. The body portion 382 is provided with engaging portions 402A and 402B with which the positioning pins 400A and 400B are engaged so as to position the tool 380.

The supporting portion 384 of the tool 380 has an elongated beam structure which can be bent by operating forces of lift members 404A–404G. A workpiece fixing portion 406 is formed on the lowest end surface of the supporting portion 384, and the workpiece 92 is adhered on the bottom surface of the workpiece fixing portion 406.

In the sixth embodiment, the seven lift members 404A–404G apply the operating forces through the correction pins 388A–388G to the supporting portion 384 of the tool 380 or the workpiece 92. The operating points or locations therefore becomes seven points or locations and a seven-point bend of the tool 380 can be therefore obtained.

Figure 32:
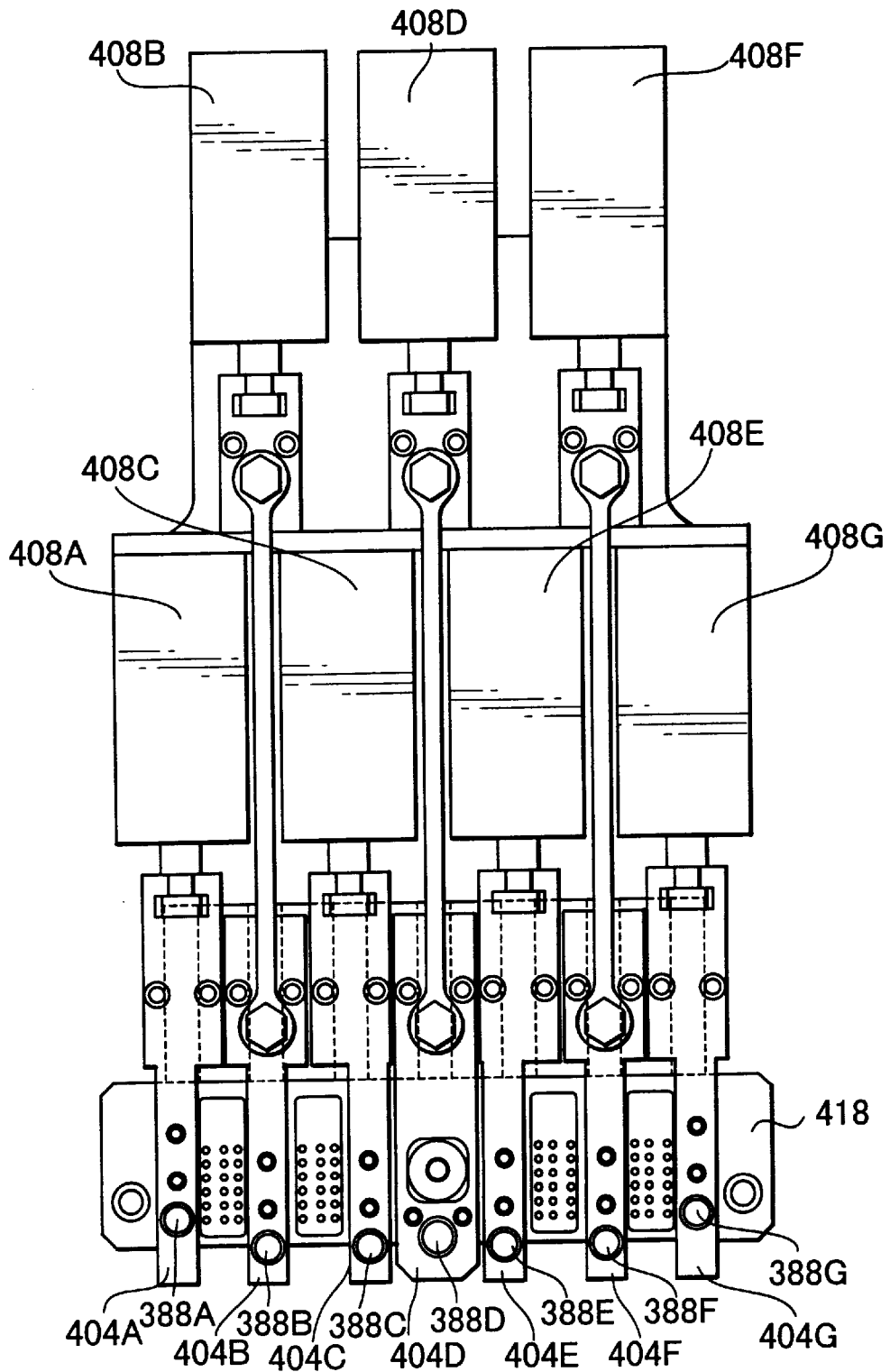
FIG. 32 is a partial front view of the lapping apparatus according to the sixth embodiment of the present invention.

The structure of the apparatus for lapping magnetic heads of the sixth embodiment will be explained with reference to FIGS. 32–34. In the sixth embodiment, the structures of the magnetic actuators or the low-friction type cylinders for balance correction are basically the same as those of the lapping apparatus in FIGS. 26 and 30.

Seven low-friction type cylinders 408A–408G for bow correction are provided vertically in two lines to apply operating forces through lift members 404A–404G to correction pins 388A–388G. Namely, the low-friction type cylinders 408B, 408D and 408F for bow correction are provided in an upper line, and the low-friction type cylinders 408A, 408C, 408E and 408G for bow correction are provided in a lower line. Each of these low-friction type cylinders 408A–408G has the same structure as that of the fifth embodiment.

Figure 33:
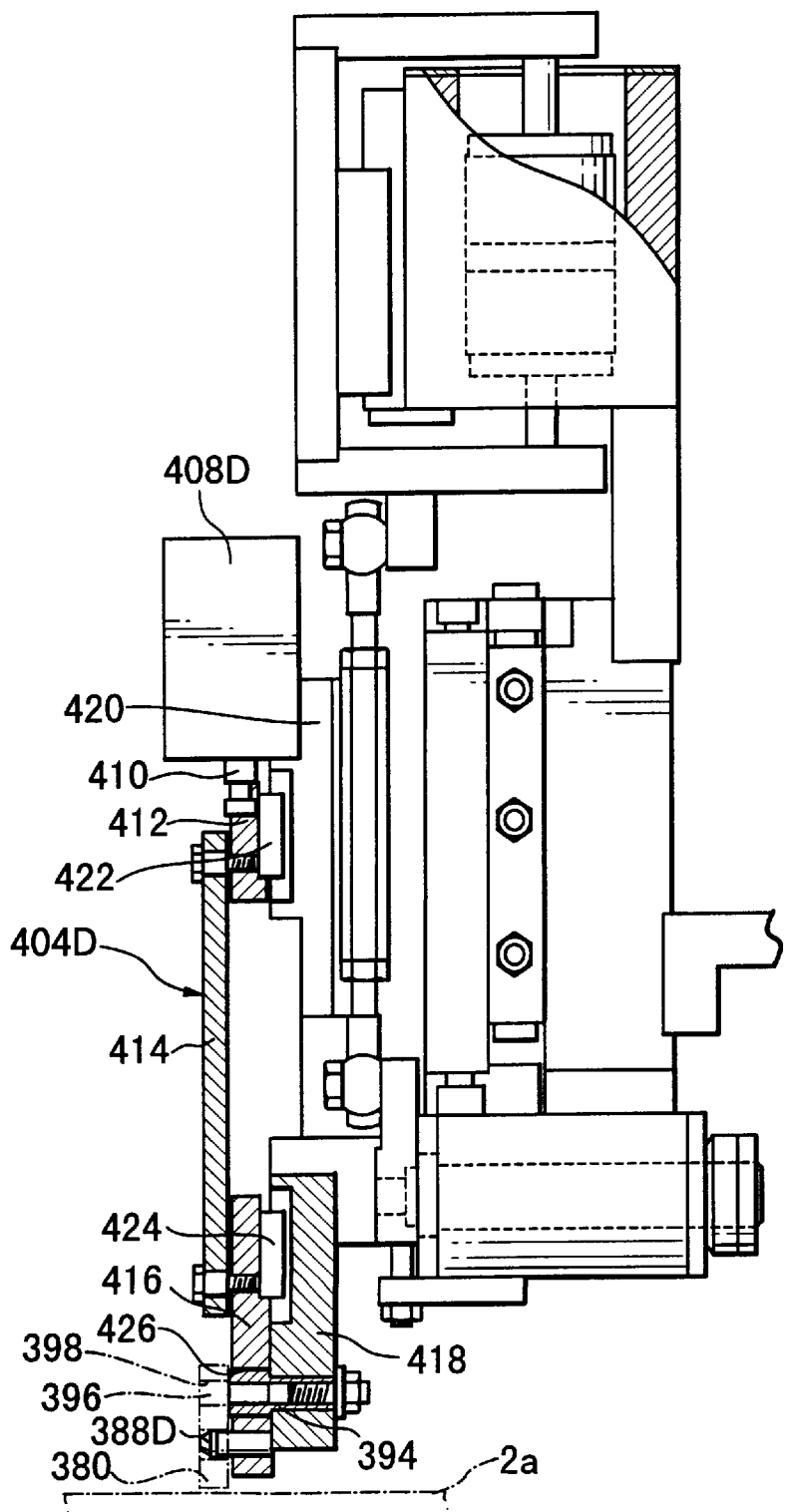
FIG. 33 is a sectional side view of the lapping apparatus cut at the position of a bow correction pin 388D located at the center of the tool according to the sixth embodiment of the present invention.

Referring to FIG. 33, the low-friction type cylinder 408D for bow correction works so as to apply an operating force to the center correction pin 388D of the tool 380. The low-friction type cylinder 408D is attached to the upper end of an upper extended portion 420 of a back plate 418. The lift member 404D for bow correction is integrally attached to the lower end of a rod 410 of the low-friction type cylinder 408D. The lift member 404D is comprised of an upper sliding member 412 connected with the lower end of the rod 410, a lower sliding member 416 and a connecting rod 414 connecting the upper and lower sliding members 412 and 416. The upper slide member 412 is slidable on an upper slide bearing 422 provided on the front surface of the upper extended portion 420 of the back plate 418. The lower slide member 416 is slidable on a lower slide bearing 424 provided on the front surface of the back plate 418. The lift member 404D is provided with a through hole 426 on its lower end. The fixing pin 394 secured to the back plate 418 is inserted into a through hole 426 and the front end of the fixing pin 394 is further inserted into the fixing hole 398 of the tool 380. The tool 380 is fixed to the back plate 418 by the screw 396 being attached to the fixing pin 394.

An operating force is applied through the lift member 404D by the low-friction type cylinder 408D to the correction pin 388D. As a result, the supporting portion 384 of the tool 380 is bent and the height of the workpiece 92 corresponding to the location of the correction pin 388D can be minutely changed.

The lift members 404B and 404F for the low-friction type cylinders 408B and 404F have the same structures as the lift member 404D for the low-friction type cylinder 408D. However, the lower slide members 424 of the lift members 404B and 404F are not provided with the through holes 426 and the fixing pins 394.

Figure 34:
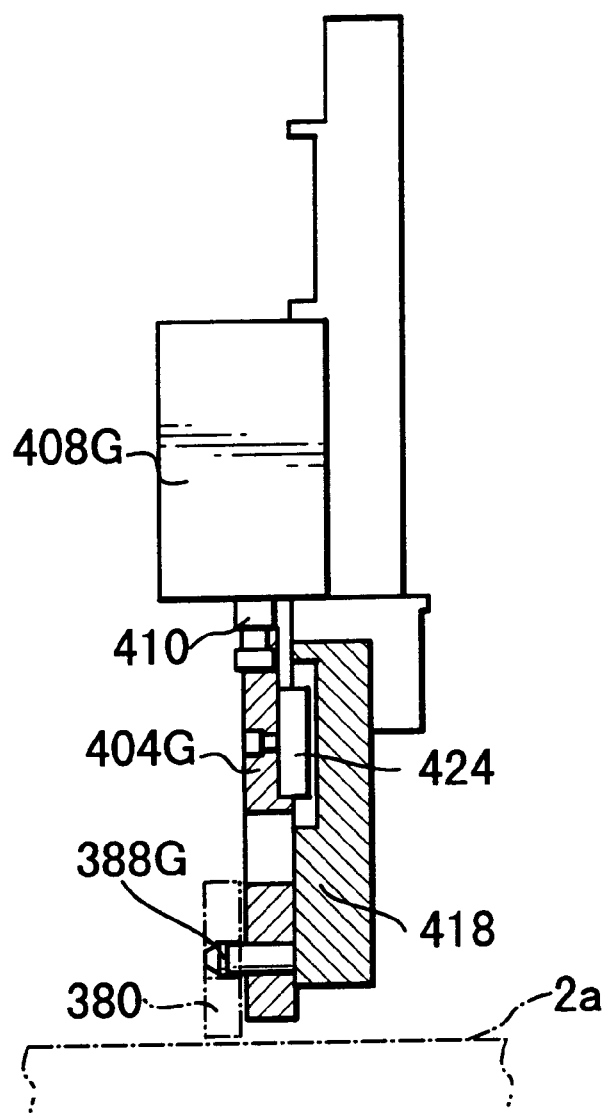
FIG. 34 is a partial sectional side view of a bow correction actuator cut at the position of a bow correction pin 388G according to the sixth embodiment of the present invention.

Referring to FIG. 34, the low-friction type cylinders 408G for bow correction works so as to apply an operating force to the correction pin 388G of the tool 380. The lift member 404G for bow correction is integrally attached to the lower end of the rod 410 of the low-friction type cylinder 408G, and the lift member 404G is provided so as to move or slide along the slide bearing 424. When the rod 410 of the low-friction type cylinder 408G for bow correction moves up and down, an operating force is applied to the correction pin 388G through the lift member 404G. As a result, the supporting portion 384 of the tool 380 is bent and the height of the workpiece 92 corresponding to the location of the correction pin 388G can be minutely changed.

The lift member 404A has the same structure as that of the lift member 404G in FIG. 34. The lift members 404C and 404E has the same structures as those of the lift member 404G except of the sizes of the correction holes 390C and 390E of the tool 380.

The operation of the apparatus for lapping magnetic heads according to the sixth embodiment of the present invention will be explained. In the sixth embodiment, the seven low-friction type cylinders 408A–408G are provided and the low-friction type cylinders 408A–408G apply the operating forces through the seven correction pins 388A–388G to the supporting portion 384 of the tool 380. As a result, the ceramic bar 104 or the workpiece 92 can be bent in an approximate eighth degree curve pattern and the more complicated correction therefore can be carried out.

Further, in the sixth embodiment, the low-friction cylinders 408A–408G of bow correction are employed instead of the magnetic actuators for bow correction. Therefore, larger operating forces can be obtained by using the low-friction cylinders 408A–408G with more compact structures in comparison with the magnetic actuators.

Figure 35:
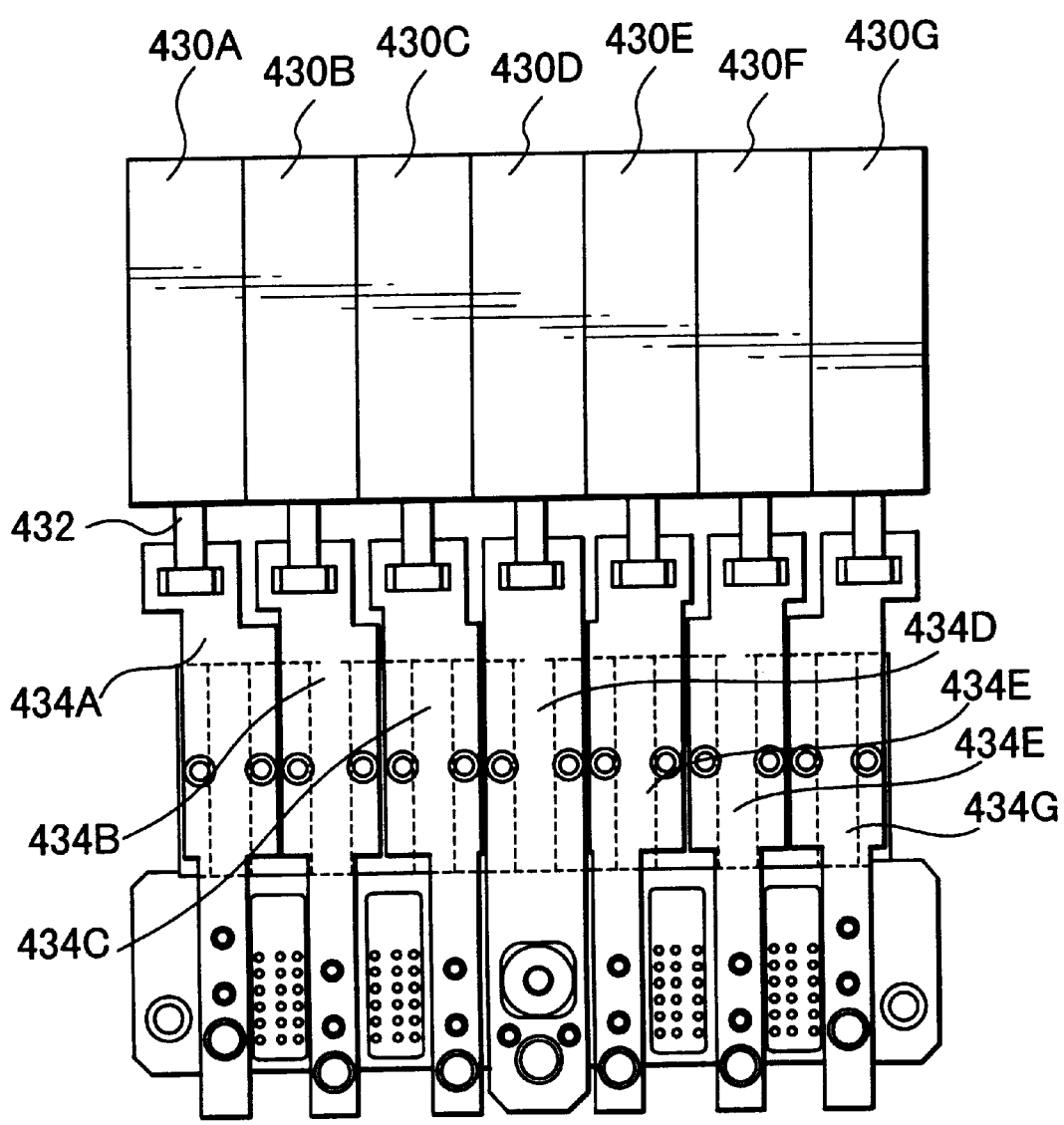
FIG. 35 is a partial front view of the lapping apparatus according to another example of the sixth embodiment of the present invention.

Another example of the sixth embodiment of the present invention will be explained with reference to FIG. 35. In the another example of the sixth embodiment, seven low-friction type cylinders 430A–430G are provided in a line. Lift members 434A–434G are integrally attached to the lower ends of the rods 432 of the low-friction type cylinders 430A–430G. Other structures of the lapping apparatus of the another example of the sixth embodiment are the same as those of the lapping apparatus in FIGS. 32–34. According to the another example of the sixth embodiment, the size of the lapping apparatus become more compact since the low-friction type cylinders 430A–430G are provided in a line.

According to the embodiments of the present invention explained above, the locations to which the operating forces are applied are three, five or seven. However, in the present invention, the locations to which the operating forces are applied may be provided on the center of the tool and provided symmetrically with respect to the center of the tool in the right and left directions.

Further, in the present invention, the locations to which the operating forces are applied may be provided on a plurality of predetermined locations of the tool.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An apparatus for lapping a workpiece including a plurality of magnetic heads supported by a tool, the apparatus comprising:

a rotary lapping table having an abrasive surface;

lapping head attachment means provided so as to be movable with respect to the lapping table;

an adjuster ring resiliently supported by the lapping head attachment means so as to contact with the abrasive surface;

a lapping head attached to the adjuster ring, the attitude of the lapping head being controlled by the adjuster ring;

a tilting assembly attached to the lapping head so as to tilt around a tilt shaft parallel with the abrasive surface;

tilting assembly drive means for tilting the tilting assembly with respect to the abrasive surface;

a lift assembly movable up and down with respect to the tilting assembly;

a back plate pivotally attached to the lower portion of the lift assembly, said tool being attached to the back plate;

first actuator means for correcting balance by applying forces on right and left sides of the pivotal point of the back plate; and second actuator means for correcting bow of the workpiece by applying operating forces on a plurality of predetermined locations of the tool so that the moving directions of movable parts of the second actuator means are substantially parallel with the directions of the operating forces.

2. The apparatus according to claim 1, wherein said first actuator means is provided so that the moving directions of movable parts of the first actuator means are substantially parallel with the directions of the forces.

3. The apparatus according to claim 1, wherein said second actuator means includes a plurality of low-friction type cylinders.

4. The apparatus according to claim 1, wherein said first actuator means includes a plurality of low-friction type cylinders.

5. The apparatus according to claim 1, wherein said adjuster ring is rotatably supported by the lapping head attachment means.

6. The apparatus according to claim 3, wherein said lapping head attachment means includes means for oscillating the lapping head and the adjuster ring in a predetermined angle range.

7. The apparatus according to claim 1, wherein said tool is attached at one center point to the back plate.

8. The apparatus according to claim 1, wherein the apparatus further comprises means for detecting positions of right and left ends of the tool.

9. The apparatus according to claim 3, wherein said second magnetic actuators include movable parts and stationary parts, the movable parts and the stationary parts being respectively comprised of coils and magnets or comprised of magnets and coils.

10. The apparatus according to claim 5, wherein said first magnetic actuators include movable parts and stationary parts, the movable parts and the stationary parts being respectively comprised of coils and magnets or comprised of magnets and coils.

11. The apparatus according to claim 7, wherein said predetermined locations of the tool are provided on a center of the tool and provided on the tool symmetrically with respect to the center of the tool in the right and left directions.

* * * * *

UNITED STATES PATENT AND TRADEMARK OFFICE
CERTIFICATE OF CORRECTION

PATENT NO.     : 6,217,425 B1
DATED          : April 17, 2001
INVENTOR(S)    : Hiroshi Shindou et al.

It is certified that error appears in the above-identified patent and that said Letters Patent is hereby corrected as shown below:

<u>Title page, Item [54] and Column 1, lines 1-2,</u>
Title, change "APPARATUS AND METHOD FOR LAPPING MAGNETIC HEADS" to -- TECHNIQUE FOR LAPPING A WORKPIECE WHICH INCLUDES A CORRECTION FOR BOW OF THE WORKPIECE --.

Signed and Sealed this

Twenty-fourth Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,217,425 B1
DATED         : April 17, 2001
INVENTOR(S)   : Hiroshi Shindou et al.

It is certified that error appears in the above-identified patent and that said Letters Patent is hereby corrected as shown below:

<u>Title page, Item [54] and Column 1, lines 1-2,</u>
Title, change "APPARATUS AND METHOD FOR LAPPING MAGNETIC HEADS" to -- TECHNIQUE FOR LAPPING A WORKPIECE WHICH INCLUDES A CORRECTION FOR BOW OF THE WORKPIECE --.

Signed and Sealed this

Fifteenth Day of October, 2002

*Attest:*

*Attesting Officer*

JAMES E. ROGAN
*Director of the United States Patent and Trademark Office*